(12) United States Patent
Ryan et al.

(10) Patent No.: US 8,739,000 B2
(45) Date of Patent: May 27, 2014

(54) MULTI-MODAL SIGNAL PROCESSING WITH LINEARIZATION

(75) Inventors: Timothy Ryan, San Francisco, CA (US); Ravichandran Ramachandran, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 56 days.

(21) Appl. No.: 13/421,328

(22) Filed: Mar. 15, 2012

(65) Prior Publication Data
US 2013/0246875 A1 Sep. 19, 2013

(51) Int. Cl.
*H03M 13/00* (2006.01)
*G06F 11/00* (2006.01)
*G11B 27/00* (2006.01)

(52) U.S. Cl.
USPC ............... 714/776; 714/701; 714/814

(58) Field of Classification Search
USPC ......... 714/776, 701, 724, 746, 799, 814, 1–3, 714/4.1, 5.1, 5.11, 10, 12
See application file for complete search history.

(56) References Cited

U.S. PATENT DOCUMENTS

| | | | |
|---|---|---|---|
| 7,516,386 B2* | 4/2009 | Herley et al. | 714/746 |
| 8,127,202 B2* | 2/2012 | Cornwell et al. | 714/764 |
| RE43,836 E * | 11/2012 | Morris et al. | 714/708 |
| 2010/0313084 A1* | 12/2010 | Hida et al. | 714/704 |

* cited by examiner

*Primary Examiner* — Christine Tu
(74) *Attorney, Agent, or Firm* — Sterne, Kessler, Goldstein & Fox PLLC

(57) ABSTRACT

A system for signal processing includes: a plurality of signal processing units associated with corresponding channels; a feedback channel for receiving a selected feedback signal through a selector of an output associated with each of the signal processing units; and a correlator connected to the feedback channel and having a receiving unit to receive the selected feedback signal, an error calculating unit to calculate an error based at least in part on the selected feedback signal, and a correction calculation unit to generate a correcting information based at least in part on the error. In some cases, the association between the signal processing units and the signal channels is configured based on a mode.

21 Claims, 20 Drawing Sheets

MULTI-MODAL SIGNAL PROCESSING WITH LINEARIZATION

BACKGROUND

Related Art

Signal processing devices appear in a wide range of technical areas. In addition to quality signal capture, analysis, and computation, needs for efficiency in processing information at high volume, low speed, and minimum cost are among driving concerns. Conventional systems include specialized single-use devices with limited flexibility in terms of processing varying numbers of signals and accommodating varying requirements for processing at higher speeds. Thus, conventional systems separate implementations for accommodating varying volume and speed requirements. These conventional systems also include redundant and duplicative signal processing hardware, resulting in increased cost and size. Thus, more flexible, smaller, and simplified solutions in the field are required.

BRIEF DESCRIPTION OF THE DRAWINGS/FIGURES

Embodiments of the disclosure are described with reference to the accompanying drawings. In the drawings, like reference numbers indicate identical or functionally similar elements. Additionally, the left most digit(s) of a reference number identifies the drawing in which the reference number first appears.

Figure 1:
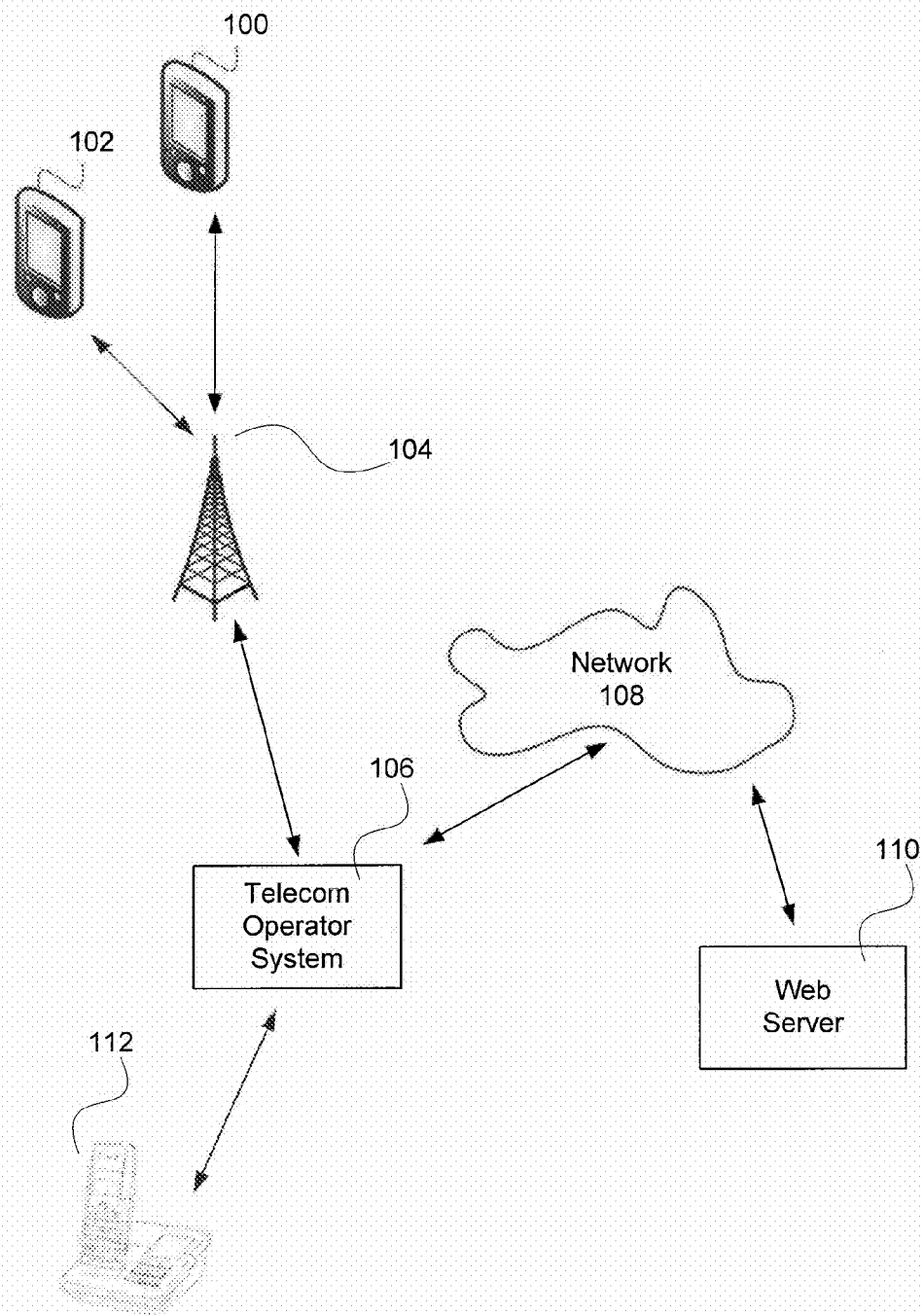
FIG. 1 is a diagram illustrating an embodiment of a communication network incorporating mobile devices.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Those skilled in the relevant art(s) would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the relevant art(s) would further appreciate that the various illustrative logical blocks, modules, circuits, and algorithm steps described in connection with the embodiments disclosed herein implemented in hardware, firmware, software, or any combination thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments.

The various illustrative logical blocks, modules, and circuits described in connection with the embodiments disclosed herein may be implemented or performed as instructions stored on a machine-readable medium, which may be read and executed by with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. A machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

The steps of a method or algorithm described in connection with the embodiments disclosed herein may be embodied directly in hardware, in a software module executed by a processor, or in a combination of the two. A software module may reside in the machine-readable medium as described above or any other form of storage medium known in the relevant art(s). An exemplary nonvolatile storage medium is coupled to the processor such the processor can read information from, and write information to, the storage medium. In the alternative, the nonvolatile storage medium may be integral to the processor. The processor and the nonvolatile storage medium may reside in an ASIC.

The following Detailed Description of the exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

A technique for signal processing is disclosed. In some embodiments, a system for signal processing includes: a plurality of signal processing units associated with corresponding signal channels; a feedback channel to receive a selected signal through a selector of an output associated with each of the signal processing units; and a correlator connected to the feedback channel and comprising a receiving unit to receive the selected signal, an error calculating unit to calculate an error based at least in part on the selected signal, and a correction calculation unit to generate a correcting signal or a set of correction parameters based at least in part on the error.

In some embodiments, correcting information comprises a correcting signal or a correcting parameter set. In some embodiments, the system for signal processing includes: a mode selection logic to configure an association between a plurality of signal processing units and one or more signal channels based upon a selected mode of a plurality of modes, wherein the plurality of modes includes a single-channel mode and a multi-channel mode; a feedback channel to receive a selected signal through a selector of an output from each of the signal processing units; and a correlator connected to the feedback channel and comprising a receiving unit to receive the selected signal, and a correction calculation unit to generate a correcting signal or a set of correction parameters based at least in part on the error.

In some embodiments, for a base station for a mobile telecom network, the association between the signal processing units and the signal channels is configured based on a mode. For example, in an interleaved mode, a set of signal processing units processes the odd samples of a channel and another set processes the even samples of the channel. In various embodiments, in the interleaved mode a single channel is processed using N sets of processors at an N times effective sample rate of the individual set processing speed (e.g., 4 signal processing sets achieve a 4× effective sample rate). The interleaved mode thus is an example of a single-channel mode in accordance with some embodiments.

In some embodiments, the sampling of the output of channel amplifiers is done in a time division manner. For example, each channel output is sampled for a time period (e.g., a chunk of time) and then the next channel is sampled according to a schedule or in sequential order (e.g., channel 1, channel 2, channel 3, channel 4, etc.). The samples of the output signal are fed back to a processor that calculates an error (e.g., correlates the feedback signal with the input signal, or calculates an error or error metric between the two signals, etc.). Using the error signal, a correcting signal or set of correction parameters is calculated. The correcting signal or set of correction parameters is then provided to the signal processors for the channel whose output was initially sampled. The signal processing for the channel is then adjusted to reduce the error (e.g., distortion, crosstalk, etc.). The next channel is then corrected similarly. The sampling of the outputs and the updating of the correction to a given channel are appropriately timed to take into account the delays involved with calculating the updates for the correction by the processor (e.g., a correlator).

In some embodiments, the sampling of the output of a channel (e.g., at the output of an amplifier going to the antenna) is performed at a fractional rate of the processing of the channel in the processor—for example, the sampling is at 1/N, where N is an integer, of the channel processor rate. As an example, the output of the channel is sampled at 250 MHz, whereas the channel is processed at 1 Gsamples/second so that the fractional rate is 1/4.

In some embodiments, for a base station for a mobile telecom network, a signal processing unit is disclosed that includes an ability to process one or more signals concurrently. For example, an integrated circuit or chip comprises one or more signal processing units with the ability to process one or more signals for transmission and/or reception. In some embodiments, the signal processing unit is able to change the number of signals processed concurrently. In some embodiments, the processing of a plurality of signals includes providing a corrective feedback for each of the plurality of signals that corrects for non-linear behavior of the system (e.g., correcting for non-linear amplification of each signal, linearization of the system, etc.). The output signal from an amplifier is sampled by a correction system which determines an error. This error determination is then used to reduce the error at the output of the amplifier by determining a correcting signal or correcting parameters for correcting the signal (e.g., for linear or non-linear filters) that are used to pre-process the signal to reduce the error. In some embodiments, the feedback channel of the system samples one of the channels and determines a correction signal for that channel. In some embodiments, the feedback signal samples one channel and then another channel in a rotation (e.g., channel a then b then a then b etc., or channel a, b, c, d, a, b, c, d, etc.). In some embodiments, the determination of the correction signal uses a single correlator regardless of whether the feedback channel of the system is used to sample one of the channels or the feedback channel of the system is used to sample one channel and then another in rotation. In some embodiments, two correlators are connected to the single feedback channel. For example, the even samples are sent to one correlator and the odd samples are sent to another correlator.

FIG. 1 is a diagram illustrating an embodiment of a communication network incorporating mobile devices. In the example shown, a mobile phone base station 104 handles multiple two-way communications for cell phone users communicating from a mobile phone 100 to another mobile phone 102, or to a web server 110, a land line phone 112, or any other communications platform. Each type of mobile phone that communicates with the base station 104 has a particular communications protocol including different physical layer protocols as well as different logical layer protocols. A number of mobile devices may connect to and communicate with each base station 104, and may request one or more of many specific services of the mobile device 100 or 102 over the base station 104. Such services include, but are not limited to, voice, data (Internet or otherwise), text messaging, multimedia messaging, and location services, and are transmitted through a telecom operator system 106 to a network 108 such as the Internet. Such a wide variety of potential services and variations in the number of phones interfacing with the base station at any one time requires a signal processing system that is flexible and robust enough to handle both high parallelism and high throughput.

Figure 2:
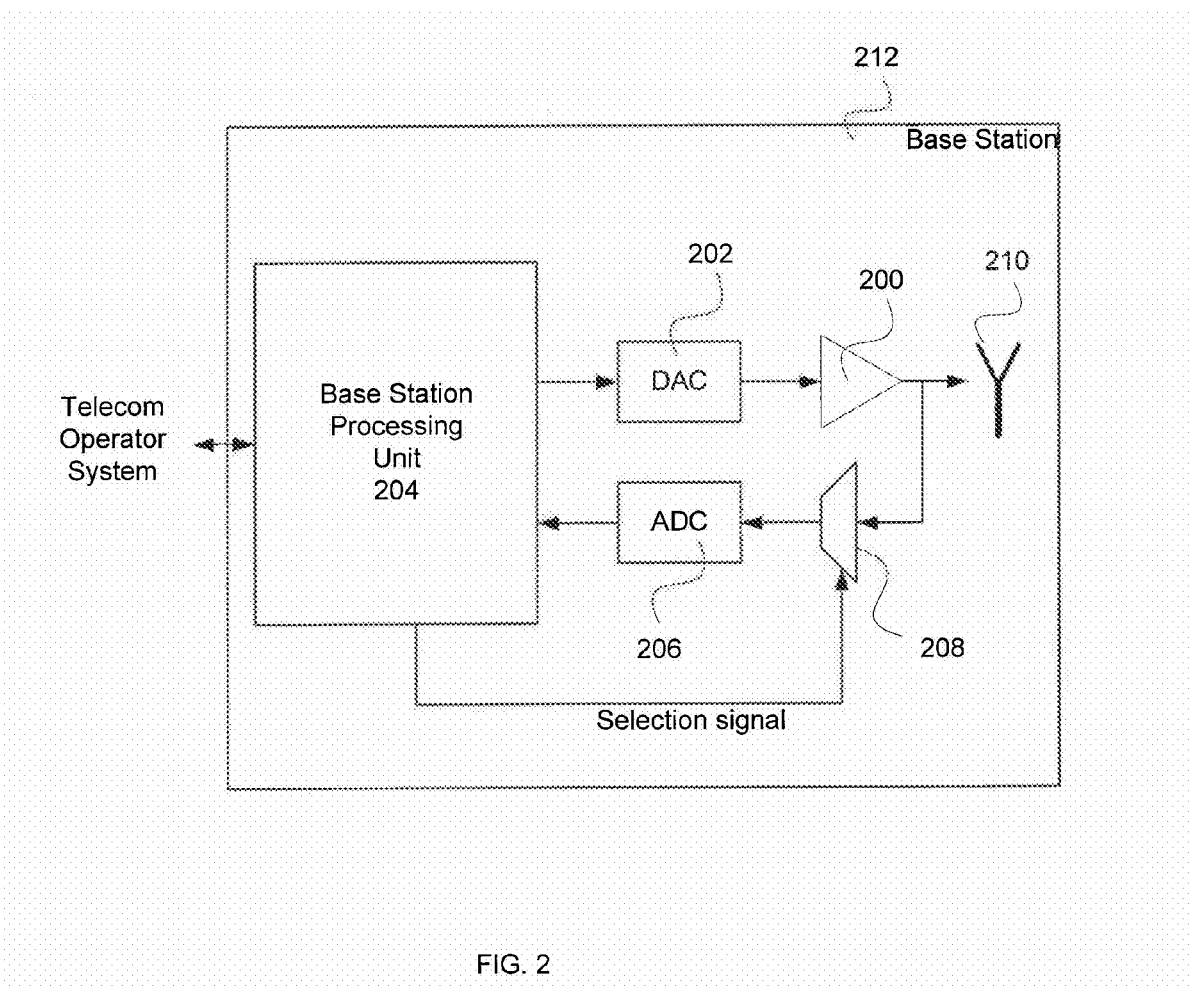
FIG. 2 is a block diagram illustrating an embodiment of an exemplary base station processing architecture.

FIG. 2 is a block diagram illustrating an embodiment of an exemplary base station processing architecture. In the example shown, base station 212 sends a plurality of signals to external devices (e.g., mobile phones). A feedback signal corresponding to a signal being sent to a particular antenna is sampled through selection hardware 208 (e.g., a multiplexer) and fed into analog-to-digital converter 206. In some embodiments, selection hardware 208 is controlled by base station processing unit 204 using a selection signal output that selects the appropriate signal from amplifier 200 (or a plurality of amplifiers 200). Once converted to digital format, the feedback signal is processed by base station processing unit 204, which is connected to the wider telecom operator system. Using the feedback signal to linearize its output, base station processing unit 204 sends a plurality of signals received from the telecom operator system out to external devices. The plurality of signals is processed by base station processing unit 204 and is then sent to digital-to-analog converters 202. After conversion to analog, the plurality of signals are then amplified by amplifier 200, and sent to antenna 210 for transmission. In some embodiments, the selection signal for sampling the outputs of amplifiers 200 is synchronized with the updating of correction parameters within base station processing unit 204. The synchronization is such that the appropriate feedback signal is used for generating a correction that is sent to the appropriate corresponding channel processing unit associated with the feedback signal.

Figure 3:
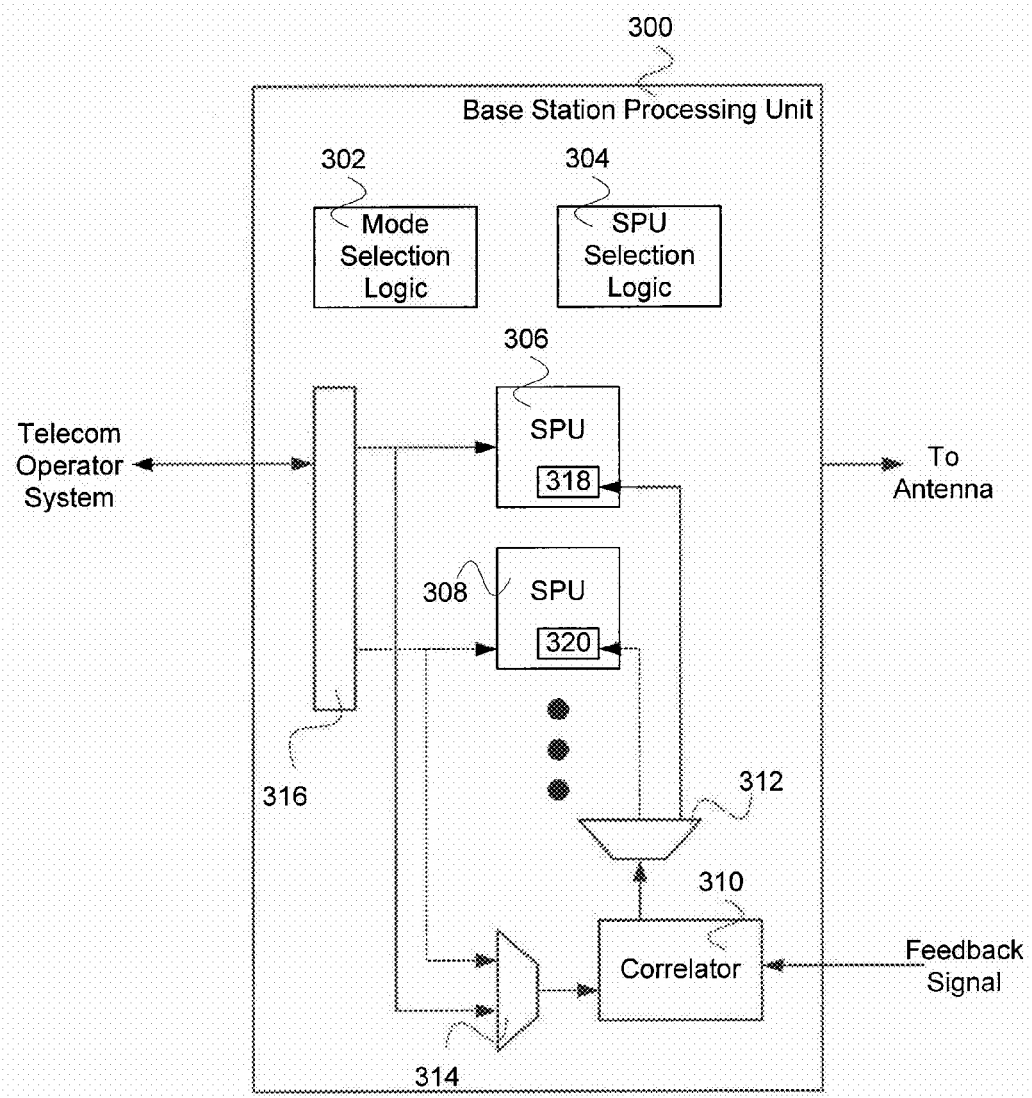
FIG. 3 is a block diagram illustrating an embodiment of an example of a base station processing unit.

FIG. 3 is a block diagram illustrating an embodiment of an example of a base station processing unit. In the example shown, base station processing unit 300 comprises mode selection logic 302, signal processing unit (SPU) selection logic 304, SPU 306, SPU 308, and correlator 310. Base station processing unit 300 receives signals from a telecom operator system and outputs to an antenna (e.g., through digital-to-analog converters and amplifiers). Base station processing unit 300 receives a feedback signal of one of the outputs as selected by selection hardware (e.g., based on a time division rotation/schedule of the plurality of output signals to the antenna—for example, selecting a first channel for a fixed period of time, enabling the taking of multiple samples, then selecting a next channel for a second fixed period of time, enabling the taking of multiple samples). Mode selection logic 302 selects a mode for base station processing unit 300 whereby base station processing unit 300 is able to process a number of signals that corresponds to the selected mode (e.g., one signal, two signals, four signals, or more signals). SPU selection logic 304 selects SPUs in various combinations to associate with input signals. For example, 14 SPUs are used to process a single channel (e.g., each SPU takes a group of samples and processes them); 14 SPUs are used to process a single channel where 7 SPUs process half of the samples and 7 SPUs process the other half of the samples (e.g., odd samples and even samples); 7 SPUs process a first channel and 7 SPUs process a second channel; 3 SPUs process a first channel, 3 SPUs process a second channel, 3 SPUs process a third channel, and 3 SPUs process a fourth channel. Any other appropriate combinations of SPUs can be used to process respective channels.

In some embodiments, selection switch 316 routes input signals from the Telecom Operator System to the appropriate SPUs based on the mode selection logic and the SPU selection logic.

In some embodiments, correlator 310 receives a feedback signal and a reference signal. The feedback signal comprises samples of amplifier output (e.g., from amplifier 200, FIG. 2) associated with a given channel. The reference signal comprises input data signal values selected using selector 314 associated with the same given channel. Correlator 310 uses the feedback signal and the reference signal to calculate an error signal, which in turn is used to generate a correction for that channel. The correction is provided, using selector 312, to a correcting unit associated with an SPU (e.g., correcting unit 318 of SPU 306 or correcting unit 320 of SPU 308). The correction is provided to the SPUs processing the given channel. Correlator 310 then receives samples of a different amplifier output associated with a different channel, which in turn are used to generate a correction for that different channel. The correction is provided to the SPUs processing the different channel. The received sampling of the outputs and the calculation of the correction as well as the providing of the correction to the appropriate channel are synchronized with appropriate accounting for delays associated with the electronics (e.g., A/D conversion, propagation, etc.), as well as calculation delays (e.g., calculation of correction parameters for linear and/or non-linear processors associated with a channel as part of SPU processing of the channel).

In some embodiments, mode selection logic 302 controls whether the system operates in a single-channel mode, multi-channel mode, other mode, or controls any other potential valid state of the device necessary for proper operation. In some embodiments, signal processing unit (SPU) selection logic 304 controls the selection of a particular signal processing unit within the bank of signal processing units, as necessary to allow proper operation with correlator 310. In various embodiments, mode selection logic 302 and SPU selection logic 304 are implemented as a single logic circuit, as circuits distributed within other elements of the base station processing unit 300, or in any other configuration that allows proper system operation. In some embodiments, a single-channel mode comprises a mode in which sets of signal processing units each process interleaved samples of a single input channel to achieve an effective higher sampling rate than the signal processing units' processing rate. In some embodiments, a multi-channel mode comprises allocating respective subsets of signal processing units to respective channels of a plurality of channels, where each subset of signal processing units processes a time division chunk of the signal of the channel at the effective rate of the signal processing units' processing rate.

Figure 4:
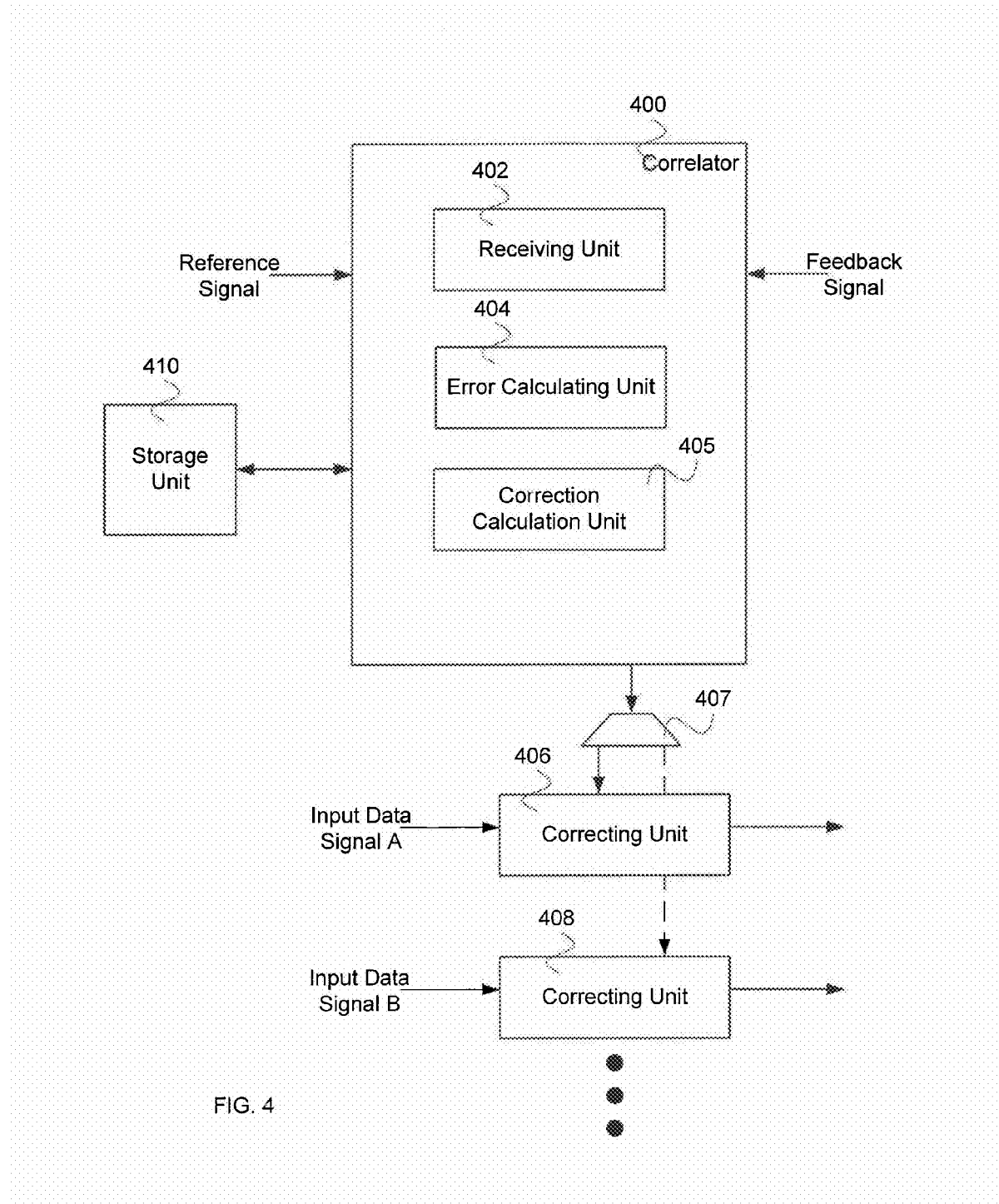
FIG. 4 is a block diagram illustrating an embodiment of a correlator.

FIG. 4 is a block diagram illustrating an embodiment of a correlator. In the example shown, correlator 400 comprises receiving unit 402, error calculating unit 404, and correction calculation unit 405. Correlator 400 provides a correcting signal or correcting parameters for correcting an input data signal to each of a plurality of correcting units. For example, input data signal A is processed using correcting unit 406 (which can be associated with and/or as part of a SPU) to linearize input data signal A. As another example, input data signal B is processed using correcting unit 408 (which can be associated with and/or as part of a SPU) to linearize input data signal B. Although two correcting units are shown in the diagram, a different number of correcting units can be used in other embodiments. In some embodiments, a multiplexer (e.g., multiplexer 407) is used to select a correcting unit that the correcting signal or the correcting parameters or set of parameters is sent to. Correlator 400 receives a feedback signal which is selected and sampled from one of a plurality of outputs after being amplified. Receiving unit 402 associates the feedback signal with the appropriate reference signal and an error is calculated between the ideal output (e.g., as determined based on the reference signal) and the feedback signal by error calculating unit 404. Details of how to determine the ideal output based on the reference signal are outside the scope of this application. The context for the reference signal and feedback signal is stored and recalled appropriately so that processing for a given selected channel resumes from a previous processing time when the channel is reselected. In some embodiments, the reference signal comprises an input data signal to a correcting unit in an SPU—for example, input data signal A or input data signal B. Correction calculation unit 405 uses the error signal to generate a correcting signal and/or a set of parameters used to correct an input data signal. The correcting signal and/or the set of correcting parameters are provided such that the input signal is corrected for linear and/or non-linear errors introduced by the signal processing and/or amplification.

In a multi-channel mode, the time division usage of correlator 400 enables the correcting of multiple input data signals to a base processing unit using a single correlator unit. This is achieved by sharing the processing resources of the single correlator unit (e.g., correlator 400) over time to generate the correcting signals/parameters for each of the multiple input data signals. In some embodiments, correlator 400 performs a receive function, a delay alignment function, an error calculation, and a correction calculation (e.g., using the error calculated between the feedback signal and a reference signal to calculate new correction coefficients).

In some embodiments, correlator 400 samples feedback of a signal (e.g., selects samples in a stream of samples) that was converted to a digital signal at the output of an amplifier (e.g., was converted to a digital signal by ADC 206 based on the output of amplifier 200 of FIG. 2, not shown in FIG. 4). Once sampled, the feedback is analyzed by error calculating unit 404 (e.g., by determining an error by calculating the difference between the feedback and a reference signal). Correction calculation unit 405 then generates a correcting signal or a set of correcting parameters and provides the correcting signal, through a feedback channel using a selector (e.g., multiplexer 407) to a correcting unit (e.g., correcting unit 406, correcting unit 408, etc.) which is associated with a signal processing unit in the signal processing unit bank. The functions and elements of correlator 400 are organized in varying numbers and types of units, and those functions and elements of correlator 400 are thus not limited to receiving unit 402, error calculating unit 404, and correction calculation unit 405.

In some embodiments, feedback samples are processed at an adjustable clock rate as compared to the channel clock handling the input data signals (e.g., input data signals A, B, etc.). In various embodiments, the adjustable clock is at a rate of 1/N compared to the channel clock—for example, 1/2, 1/3, 1/4, 1/5, 1/8, 1/N where N is any integer, or any other appropriate rate. In some embodiments, updates provided to update the correcting are also at the 1/N rate. In some embodiments, the updating of the correcting is at the 1/N rate. In some embodiments, the correcting of the signal is at the full channel rate (e.g., using a parameter set for correcting that updates filter taps or other coefficients for linear or non-linear processing of the channel).

In various embodiments, storage unit 410 comprises a solid-state, magnetic, or any other type of memory capable of storing the state of correlator 400 including each of the sub-units of correlator 400 enabling correlator 400 to switch contexts when switching processing between one of a plurality of input data signals to the base processing unit and when providing a correcting signal to one of a plurality of input data signals. The state of correlator 400 is stored in storage unit 410. The state stored in storage unit 410 comprises a context of the processing of a signal as fed back and sampled for which an error is generated and for which a correcting signal and/or a set of correcting parameters is generated. Respective contexts thus correspond to respective feedback signals, which are associated with input signals and the input signals' associated SPUs or sets of SPUs. The correcting signal and/or set of correcting parameters are used to correct the same signal as is associated with the signal that was originally associated with the feedback signal. The context enables prior knowledge of the signal and/or prior knowledge of the correcting signal and/or correcting set of parameters to be used to generate better correcting signals and/or correcting sets of parameters for a next sampled signal from an amplified version of the signal. In some embodiments, the amplified version of the signal has linear and/or non-linear distortion that is to be corrected using a correcting signal and/or a correcting set of parameters. Between correlator 400 and storage unit 410, there is a storage channel that is connected between correlator 400 and storage unit 410 to receive and transmit a state (e.g., a context state, associated channel information, time information, etc.) between storage unit 410 and correlator 400.

In some embodiments, the feedback channel comprises the connection to the output of amplifier 200 (or a plurality of amplifiers 200), selection hardware 208, ADC 206, correlator 400, multiplexer 407, and a correcting unit (e.g., correcting unit 406, correcting unit 408, etc.).

Figure 5:
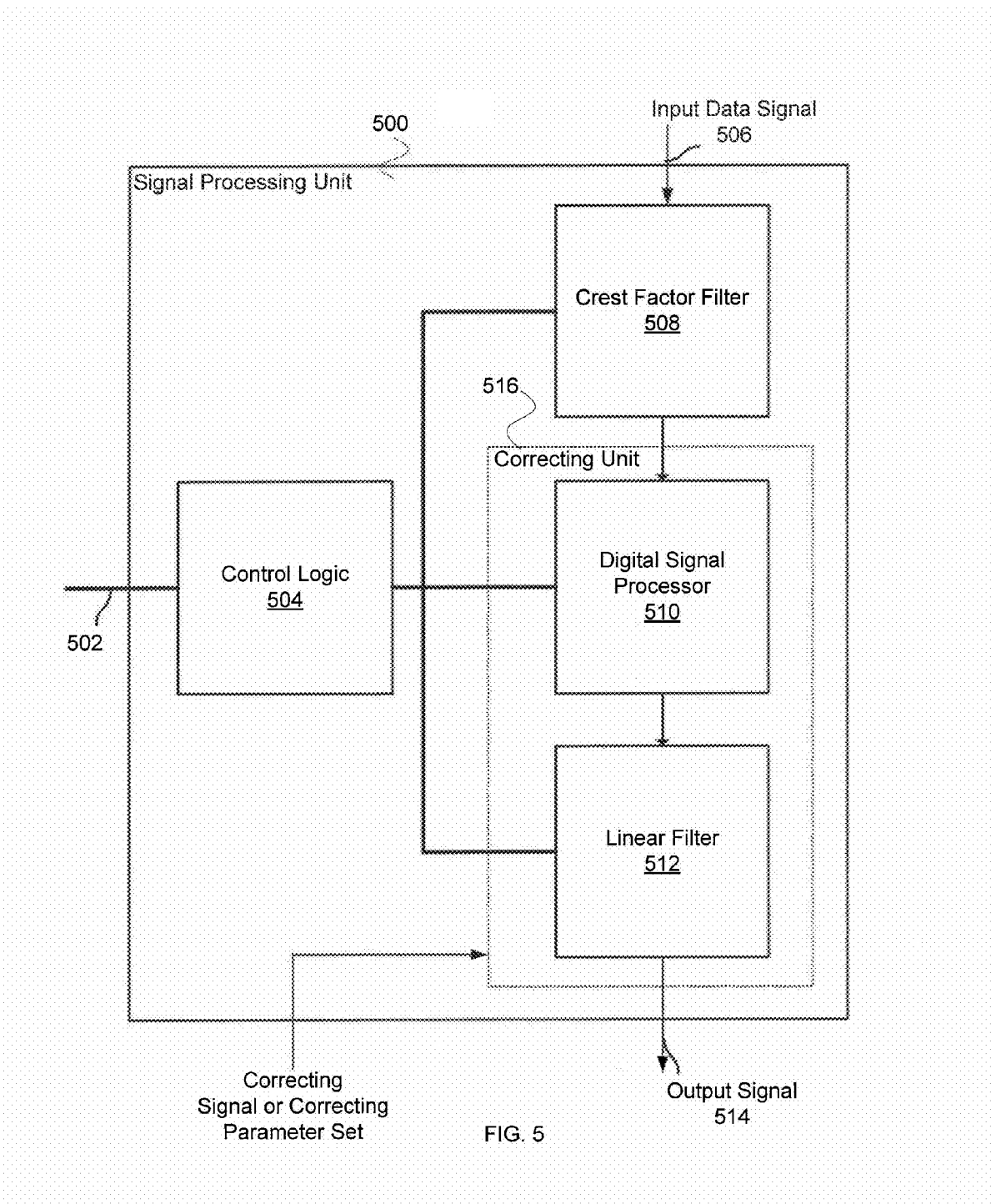
FIG. 5 is a block diagram illustrating an embodiment of a signal processing unit.

FIG. 5 is a block diagram illustrating an embodiment of a signal processing unit. In the example shown, signal processing unit 500 comprises control logic 504, crest factor filter 508, digital signal processor 510, and linear filter 512. Signal processing unit 500 communicates input data signal 506 to crest factor filter 508. Crest factor filter 508 processes input data signal 506 using a configurable squelching engine that reduces a signal's peak-to-average power ratio (PAR) while maintaining acceptable error vector magnitude (EVM). Crest factor filter 508 enables better efficiency from a power amplifier following the SPU 500 by removing peaks and thus putting more of the signal at higher power without unduly affecting signal properties. Digital signal processor 510 and linear filter 512 reduce distortion at the output of an amplifier.

In some embodiments, correcting unit 516 of signal processing unit 500 comprises digital signal processor 510 and linear filter 512. In some embodiments, correcting unit 516 receives the correcting signal or a set of correcting signal parameters that are used to reduce distortion. In some embodiments, digital signal processor 510 and linear filter 512 run in parallel to reduce linear and non-linear distortion in the final output signal. Output signal 514 is output to the amplifier. Output of the amplifier is sampled and fed back to a correlator (e.g., correlator 400, FIG. 4) that calculates a correcting signal or a set of correcting signal parameters that are used by digital signal processor 510 and/or linear filter 512 to correct one or more channels. The fed-back output signals of the amplifier are digitized in a time division such that each of the output signals is sampled and appropriately processed to be able to generate a correcting signal or correcting signal parameter sets for each of the channels. In some embodiments, the distortion in each of the signal channels is due to non-linear properties of the amplifier and/or other portions of the signal processing chain of the channel. Control logic 504 receives input 502 for configuration of signal processing unit 500 including the time division information for processing correcting signal or correcting parameter sets that are to be applied to the input signal, enabling a reduced distortion at the output of an amplifier associated with output signal 514.

Figure 6:
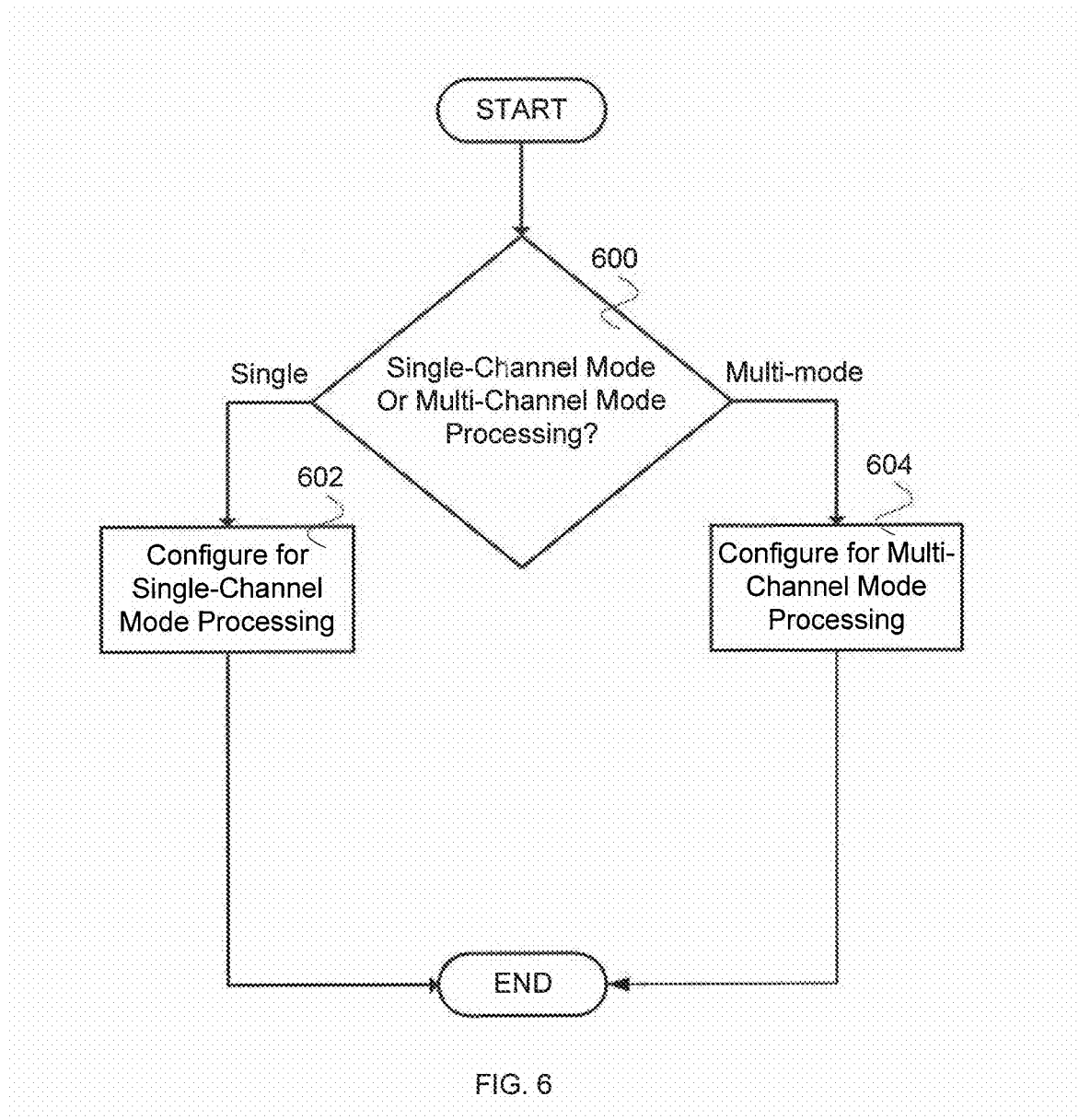
FIG. 6 is a flowchart illustrating an embodiment of an operation process for a multi-mode signal processing system.

FIG. 6 is a flowchart illustrating an embodiment of an operation process for a multi-mode signal processing system. In the example shown, in 600 it is determined whether the processing is single-channel mode or multi-channel mode. In the event that the processing is single-channel mode, then in 602 the base station processing unit is configured for single-channel processing mode. For example, a soft switch, a configurable switching matrix, or a hardware switch matrix (e.g., using fused switches) is configured for processing a single input channel and providing a single output channel. In some embodiments, during single-channel processing a first set of SPUs of the chip are allocated to process the odd samples input to the base station processing unit for the single channel and a second distinct set of SPUs are allocated to process the even samples input to the base processing unit for the single channel. In some embodiments, in the event that two sets of SPUs are respectively processing the odd and the even samples, the odd and even samples are reinterleaved after processing before outputting to be amplified. In some embodiments, the resources of the chip are allocated to one channel for single-channel processing or split between multiple channels for multi-channel processing, depending on the mode. In some embodiments, a single correlator is used to feed single-channel or multiple-channel processing by time division multiplexing of the feedback. In the event that the processing is in multi-channel mode, then in 604 the base station processing unit is configured for multi-channel processing mode. For example, the resources in the chip (e.g., SPUs) are divided between a number of channels (e.g., 2 channels, 4 channels, etc.) and the resources process a chunked portion of the signal (e.g., a first time portion of a signal is processed using a first SPU and a second time portion of the signal is processed using a second SPU, etc.). In some embodiments, the system includes other modes that are selected that modify the standard single-channel mode and multi-channel mode operation—for example, a diagnostic mode or a fail-safe mode.

In some embodiments, in the event that the selected mode comprises an interleaved mode (e.g., single-channel mode), the base station processing unit is configured such that the association between signal processing units and a channel comprises a first subset of the signal processing units that processes a first deinterleaved set of data from the channel and a second subset of the signal processing units that processes a second deinterleaved set of data from the channel. In some embodiments, the configuration includes a deinterleaver for separating an odd set of samples and an even set of samples of a channel input so that a different set of SPUs can process the odd samples or the even samples. In some embodiments, the configuration includes a reinterleaver for reassembling the signal at the output of the SPUs (or in any appropriate portion of the base station processing unit) such that the even and odd samples are reassembled into a single stream before outputting to a D/A converter and/or an amplifier.

In the event that the selected mode comprises a chunk shared mode (e.g., a multi-channel processing mode), the base station processing unit is configured such that the association between the signal processing units and a channel comprises a configuration where a first time portion of the data from the channel is processed by a first signal processing unit and a second time portion of the data form the channel is processed by a second signal processing unit, etc. In various embodiments, there are any number of SPUs involved in processing a channel's data samples in sequential portions—for example, 1 SPU, 2 SPUs, 3 SPUs, 4 SPUs, 5 SPUs, 7 SPUs, etc. In some embodiments, the chunk shared mode enables processing with a lower overall delay in processing, a higher precision in processing, a higher throughput in processing, or any other appropriate advantage for processing.

Figure 7:
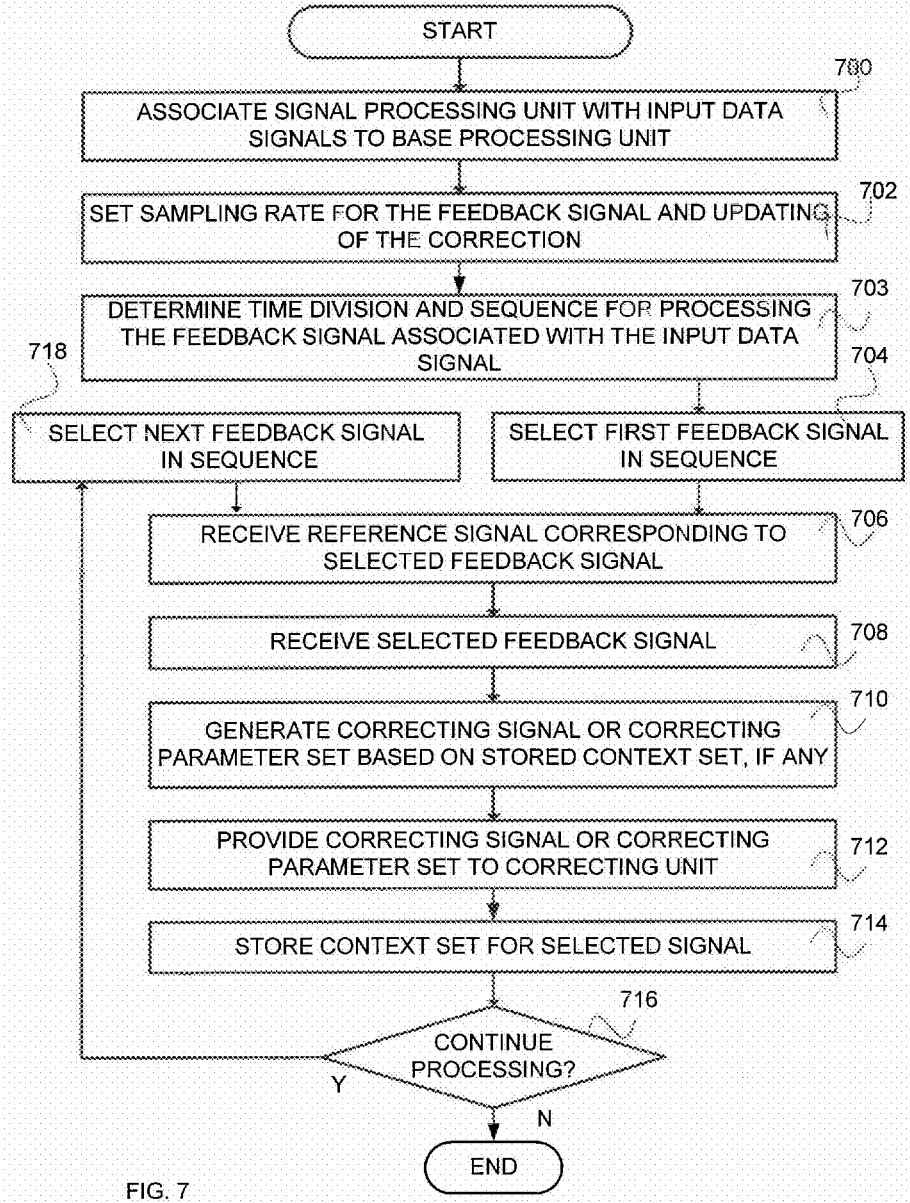
FIG. 7 is a flowchart illustrating an embodiment of an operation of an error correction system including selection of a sampling rate.

FIG. 7 is a flowchart illustrating an embodiment of an operation of an error correction system (e.g., a system as shown in FIGS. 2-5) including selection of a sampling rate. In the example shown, in 700, signal processing units are associated with input data signals to a base processing unit. For example, input data signal A to base processing unit is associated with signal processing units 1, 2, and 3; input data signal B to base processing unit is associated with signal processing units 4, 5, and 6.

In 702, the sampling rate is set for the feedback signal and for updating of the correction. For example, the sampling rate is set at a rate that is a fraction of the channel rate (e.g., the digital sample rate for processing signals in a given channel). In some embodiments, the update rate is not the same as the sample rate set for the feedback channel. For example, the update rate is a fractional rate of the channel rate (e.g., the rate of processing in the digital signal processor for reducing distortion) and/or the feedback channel rate. In some embodiments, the correlator is shared among more than one SPU so that there may be long periods where there is no updating of the parameters for the correction for reducing distortion.

In 703, a time division and sequence for processing the feedback signal associated with the input data signal are determined. In some embodiments, the time division and sequence comprise a cycling of the feedback signals in order (e.g., a first feedback signal for a time T, a second feedback signal for a time T, a third feedback signal for a time T, etc.).

In 704, a first feedback signal is selected in sequence. For example, a multiplexer is set to select the appropriate feedback signal, which is converted to digital and is input to a correlator.

In 706, a reference signal corresponding to the selected feedback signal is received. In some embodiments, the reference signal comprises a signal at an input of a SPU (e.g., input data signal A of FIG. 4), where the SPU is processing the input data signal corresponding to the feedback signal. In some embodiments, the reference signal is received at the correlator (e.g., see FIG. 4).

In 708, the selected feedback signal is received. For example, the selected feedback signal and the reference signal are used by the correlator to determine an error signal. In some embodiments, an analog output signal of an amplifier (e.g., amplifier 200 of FIG. 2) is converted to a discrete time signal and fed back to the correlator. In some embodiments, the correlator uses the error signal to determine a correcting set of tap weights, which in turn are used by a correcting unit in a SPU for correcting linear and non-linear error from the input data signal being processed by the SPU.

In 710, a correcting signal or a correcting parameter set is generated based on a stored context set, if any. For example, the correcting signal or correcting parameter set is based on information stored regarding previous correcting signals, correcting parameter sets, previous sampled input signals, previous sampled feedback signals (e.g., sampled amplifier output signals), or any other appropriate signals or information stored as contexts.

In 712, the correcting signal or correcting parameter set is provided to a correcting unit. For example, the correcting signal or correcting parameter set (e.g., tap weights) is updated in a correcting unit of a SPU. The updated correcting unit is used to process the input data signal. The processing of the correcting unit corrects for linear and non-linear distortion as they appear at the output of the base station (e.g., after the D/A converters, power amplifiers, antennas, etc.). The distortion is measured by comparing the output of the base station to the input data signal.

In 714, a context set for the selected signal is stored. In some embodiments, context information comprises running totals, intermediate results, and/or integration calculation values for calculations performed by the correlator. For example, the correlator receives a signal that is fedback from a sending antenna that has been digitized. The digitized signal is decoded so that an error signal can be derived. In some embodiments, the digitized signal is compensated for amplitude or power and/or offset variations. In some embodiments, context information is stored regarding compensation systems for amplitude or power and/or offset variations. In some embodiments, the digitized signal has an associated carrier signal that is tracked for demodulation or decoding. In some embodiments, context information is stored regarding demodulation or decoding systems. In some embodiments, the context information is used to generate a correcting signal and/or correcting parameter set(s) used to reduce lineal and non-linear distortion in a channel. In some embodiments, the correlator receives a digitized version of a feedback signal which is decoded so that it can be aligned with a corresponding desired source signal or reference signal to calculate an error signal. Coefficients for linear and non-linear correctors are adjusted (e.g., using gradient descent to adjust coefficients to target minimizing the error). In various embodiments, coefficients are adjusted for the linear correction system in real time for a period of time and then for a period of time on the non-linear correction system in real time, coefficients are adjusted for both linear and non-linear correction systems simultaneously, or coefficients are adjusted in any other appropriate manner.

In 716, it is determined whether processing continues. In the event that processing continues, control passes to 718 and a next feedback signal is selected in sequence (e.g., in a round-robin sequence). In the event that processing is not to continue, the process ends.

In some embodiments, the signals are continuously corrected using the parameter sets last updated by the feedback channel. In some embodiments, the process is repeated for one or more signal channels. In various embodiments, the process is repeated for all the signal channels, for each of the signal processing units, or any other appropriate number of iterations of the process. In various embodiments, the process selects the appropriate context state to recall based on an associated signal processing unit, channel, signal channel, input signal, or any other appropriate association.

In some embodiments, the time division is a duty cycling of the correlator for each of the feedback signal. Each feedback signal corresponds to an input data signal. Each input data signal is processed using a set of signal processing units. In some embodiments, the length of time (e.g., a time period) associated with the time division duty cycling is selectable or adjustable (e.g., 5 ms processing each feedback signal, 10 ms processing each feedback signal, 20 ms processing each feedback signal, etc.).

In some embodiments, the correcting signal is generated to reduce a difference between a desired signal and an actual signal generated as output—for example, the reduction of linear or non-linear distortion, structured noise, structured interference, or any other influence that reduces reliability or quality of the signal.

In some embodiments, the rate at which the correcting signals or correcting parameter sets are updated, referred to as the update rate, is not the same as the sample rate set for the feedback channel. For example, the update rate is a fractional rate of the feedback signal sampling rate. Both the update rate and the feedback signal sampling rate are not necessarily the same as the channel rate (e.g., the rate of processing in the signal processing units—for example, the channel rate of the digital signal processor in an SPU). In some embodiments, the correlator is shared among more than one feedback signal and its associated SPUs, so that there may be a long period when there is no updating of the parameters for the correction for reducing distortion of a respective SPU. In various embodiments, during the period when the correcting signals or the correcting parameter sets are updating, the updating occurs in real time, at a rate equal to the feedback signal sampling rate, at 1/2 the rate of the feedback signal sampling rate, at a fractional rate 1/m of the feedback signal sampling rate where m is an integer (e.g., 1/1, 1/2, 1/3, 1/4, 1/5, etc.), or at any other appropriate rate.

Figure 8:
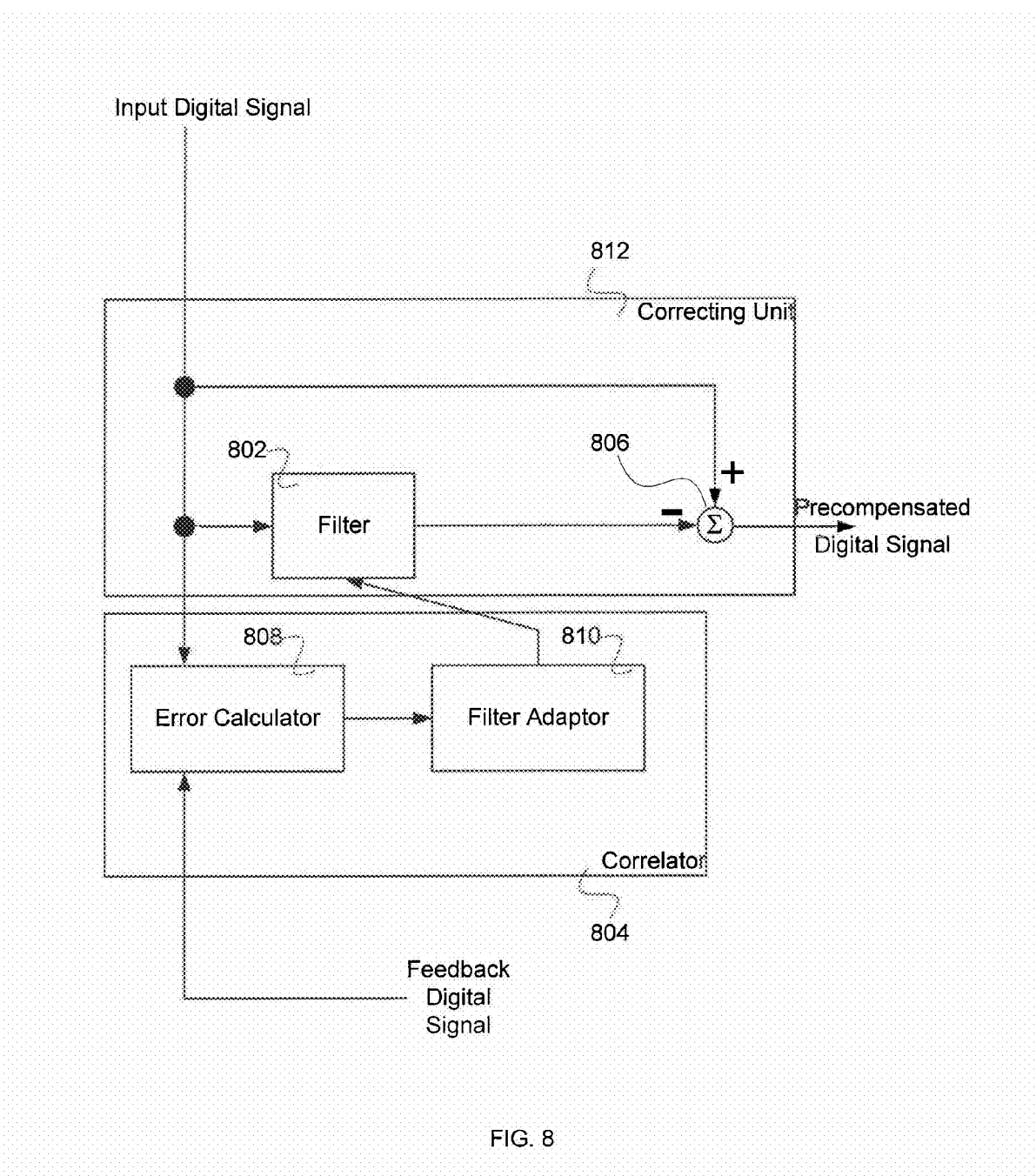
FIG. 8 is a block diagram illustrating an embodiment of a filter used in a correcting unit.

FIG. 8 is a block diagram illustrating an embodiment of a filter used in a correcting unit. In the example shown, correlator 804 receives an input data signal and a feedback digital signal and determines an error using error calculator 808. The error is used to adapt filter 802 in correcting unit 812. The input data signal is processed to precompensate the signal so that once the precompensated signal passes through the rest of the channel (e.g., digital-to-analog converter, power amplifier, etc.), the output signal minimizes the error signal. In other words, the output signal is what is desired given the input signal. In some embodiments, the precompensated digital signal comprises the input digital signal with a filtered version of the input digital signal subtracted from it using summer 806. Filter adaptor 810 adapts filter 802 in real time as error signals are fed in.

Figure 9:
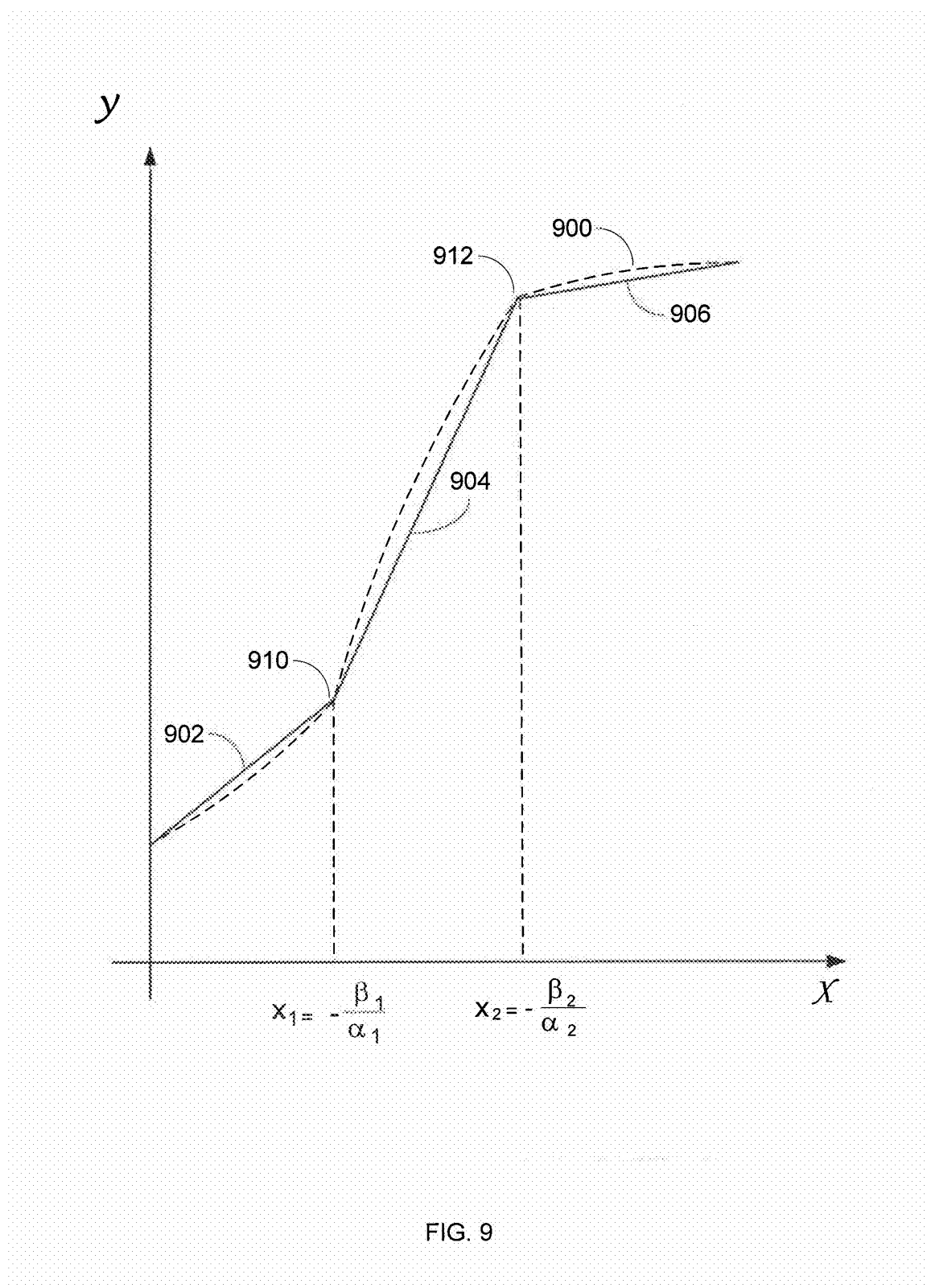
FIG. 9 is a chart illustrating one approach to the approximation of a nonlinear function according to the present application.

FIG. 9 is a chart illustrating one approach to the approximation of a nonlinear function according to the present application. A nonlinear function 900 (shown as a dashed line) is approximated by linear segments 902, 904, and 906. The linear segments are derived using techniques such as least mean square fit. The resulting approximation function is:

$$y = a \cdot x + b_0 + c_1 |\alpha_1 \cdot x + \beta_1| \alpha_2 \cdot x + \beta_2|$$ (Equation 1).

This function can be implemented using linear filters and nonlinear elements. The parameters of the linear filters are determined by the parameters in the function. It should be noted that the approximation function remains nonlinear due to the absolute value operations. Break points 910 and 912 are locations where the slopes of the segments change, and they correspond to x values of $-\beta_1/\alpha_1$ and $-\beta_2/\alpha_2$, respectively. The difference between the slopes of segments 902 and 904 is $2c_1\alpha_1$; and the slope difference between segments 904 and 906 is $2c_2\alpha_2$.

The approximation method can be generalized to model nonlinear functions. Since the resulting approximation function is comprised of linear segments that are first order polynomials, it is less complex than the original nonlinear function that is comprised of higher order polynomials, and the corresponding filter implementation is more straightforward. It is now possible to use linear filters to implement a nonlinear filter whose transfer function approximates the original, more complex nonlinear transfer function.

It is also advantageous that the first order polynomials in the linearized function are easier to compute and manipulate than the higher order polynomials in the original nonlinear function. The simplified approximation function makes it possible to adjust the filter design to make tradeoffs, yet still keep the system stable. For example, the zeroes of a linearized function may be shifted to achieve better response time, and the poles may be adjusted to stay within the desired, regions to ensure system stability. It would be more difficult to make such adjustments to a higher order nonlinear system since the poles and zeros of higher order polynomials tend to be less well behaved.

Figure 10:
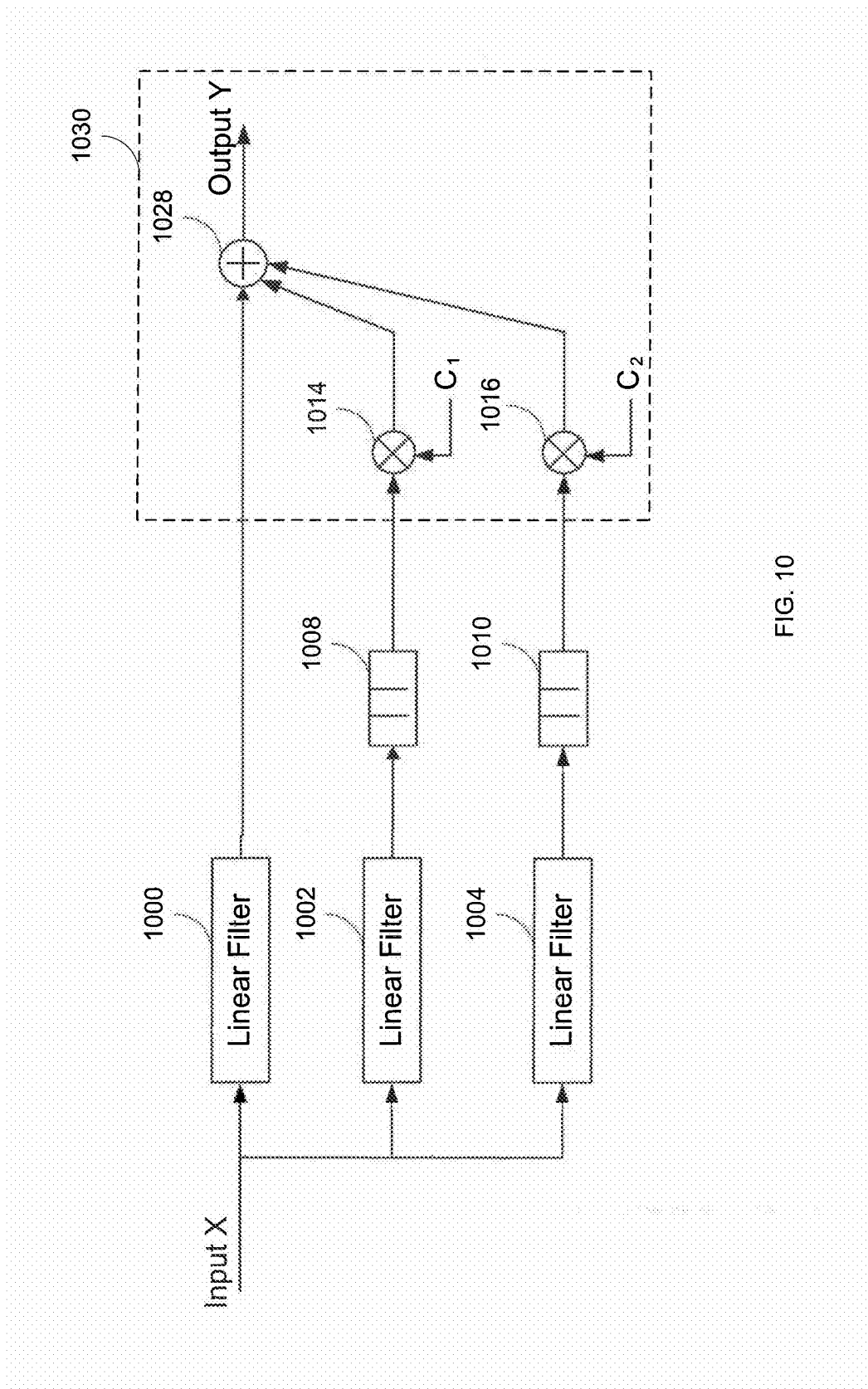
FIGS. 10 and 11 are block diagrams illustrating an embodiment of a linear filter-based nonlinear filter implementation.
Figure 11:
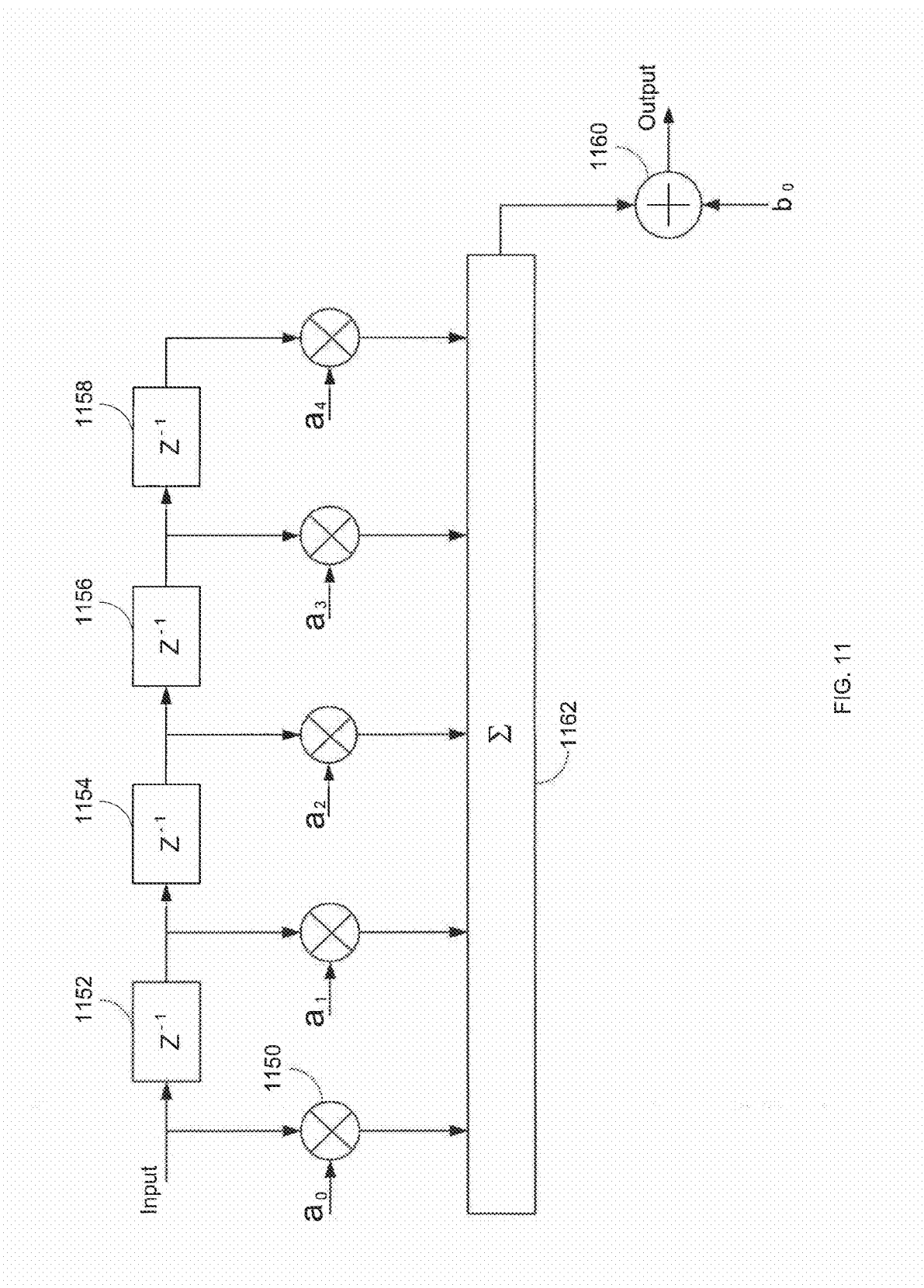

FIGS. 10 and 11 are block diagrams illustrating an embodiment of a linear filter-based nonlinear filter implementation. In the examples shown, FIG. 10 illustrates the overall architecture of the nonlinear filter. The input vector X is sent to linear filters 1000, 1002, and 1004. The outputs of filters 1002 and 1004 are sent to nonlinear elements 1008 and 1010, respectively. A nonlinear element may be a discrete component, a part of an integrated circuit chip, a processor, or any other appropriate hardware and/or software for providing a nonlinear transformation to an input. In some embodiments, each of the nonlinear elements is an absolute value operator that applies an absolute value function to its input.

The outputs of the nonlinear elements and the output of filter 1000 are combined by a combination network 1030 to produce the desired transfer function. In some embodiments, the combination network is a summation network comprised of multipliers 1014 and 1016, and combiner 1028. The outputs of nonlinear elements 1008 and 1010 are scaled by factors of C1 and C2, via multipliers 1014 and 1016, respectively. The scaled nonlinear outputs and the output from filter 1000 are summed by combiner 1028 to produce an output having a transfer function similar to Equation 1.

In the example shown in FIG. 11, the details of a linear filter are shown. In some embodiments, the filter of FIG. 11 is used to implement filters in FIG. 10 (e.g., filter 1000). The input is scaled by a factor $a_0$ using a multiplier 1150. The input is also sent to a plurality of delay stages 1152, 1154, 1156 and 1158, and the delayed signals are scaled by factors of $a_1$, $a_2$, $a_3$ and $a_4$, respectively. The scaled signals are combined by combiner 1162. A constant value $b_0$ is added to the combined result via another combiner 1160 to generate the output. The output of the filter provides an averaging affect to the overall nonlinear filter (similar to the term $a\cdot x+b_0$ in equation 1), thus the filter of FIG. 11 is sometimes referred to as an averaging filter. In some embodiments, the constant value is added to the scaled signals directly by combiner 1162, thus combiner 1160 is omitted. Different types of linear filters may be employed in other embodiments.

In some embodiments, linear filters 1002 and 1004 shown in FIG. 10 have similar architecture as the one shown in FIG. 11, although the number of delays and the scaling factors vary for different filters. These linear filters provide other terms in the transfer function, and their absolute values are taken and combined to produce the desired output. In other embodiments, the linear filters may have different designs than what is shown in FIG. 11.

In some embodiments, a simplified nonlinear filter is used in the correcting unit of an SPU.

A nonlinear filter can be generally expressed as follows:

$$y_n = A^T V_n + b + \sum_{j=1}^{K} c_j |\vec{\alpha}_j V_n + \beta_j|. \quad \text{(Equation 2)}$$

Figure 12:
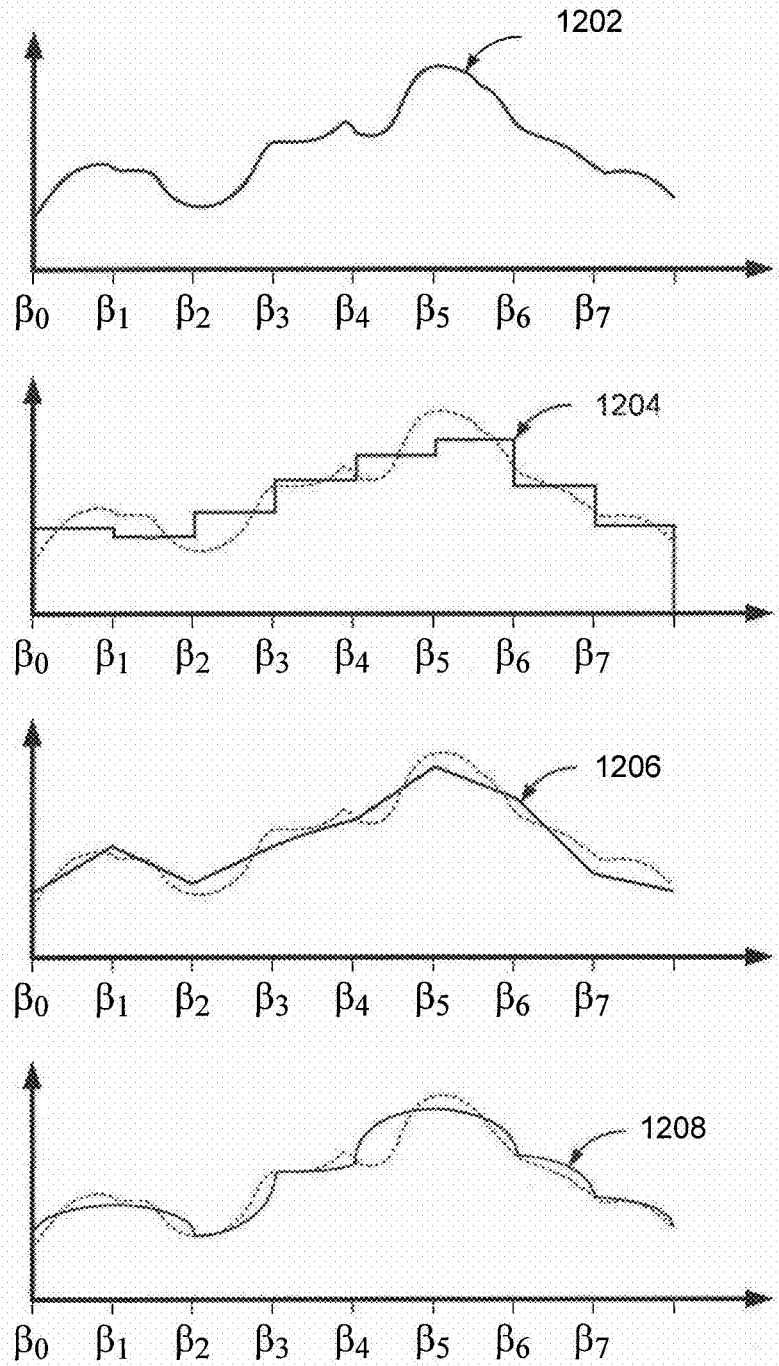
FIG. 12 is a diagram illustrating several ways of approximating a nonlinear filter response function.

FIG. 12 is a diagram illustrating several ways of approximating a nonlinear filter response function. In the example shown, the output is dependent on a one dimensional input. The techniques shown are also applicable to multi-dimensional inputs. In this example, nonlinear function 1202 can be approximated as a zero order function 1204, a first order function 1206, or a second order function 1208. As used herein, an N order function is expressed as:

$$y_n = \sum_{j=0}^{N} c_j v^j, \quad \text{(Equation 3)}$$

where $c_j$ are coefficients.

In the example shown, the input range is divided into discrete sections, marked using a set of ordered constants $\beta_0$ to $\beta_7$. The number of sections depends on factors such as performance requirements and may vary for different embodiments. The distribution of $\beta$'s across the input range may be uniform or non-uniform depending on system implementation. The zero order function 1204 is determined by approximating the transfer function in each portion of the input range (such as the input ranges between $\beta_0$ and $\beta_1$, between $\beta_1$ and $\beta_2$, etc.) using a linear, zero order function and then combining the functions. The approximation may be performed using least mean square error or other appropriate techniques to determine the suitable coefficients. Similarly, the first order approximation function 1206 is comprised of linear first order approximation functions within each portion of the input range and the second order approximation 1208 is comprised of nonlinear second order approximation functions within each portion of the input range. Higher order approximations are also possible.

The generalized nonlinear function of Equation 2 can be transformed and approximation can be made based on the transformed function. The absolute value portion of the generalized nonlinear function can be written as:

$$|\vec{\alpha}_j V_n + \beta_j| = \text{sign}(\vec{\alpha}_j V_n + \beta_j)\{\vec{\alpha}_j V_n + \beta_j\} = \lambda_{jn}\{\vec{\alpha}_j V_n + \beta_j\} \quad \text{(Equation 4),}$$

where $$\text{Sign}(\vec{\alpha}_j V_n + \beta_j) = \lambda_{jn} \quad \text{(Equation 5).}$$

Consequently, the general form of the nonlinear filter can be written as:

$$y_n = \left(a_0 + \sum_{j=1}^{K} c_j \alpha_{0j} \lambda_{jn}\right) v_n + \ldots + \quad \text{(Equation 6)}$$

-continued $$\left(a_{2N-2} + \sum_{j=1}^{K} c_j \alpha_{2N-2,j} \lambda_{jn}\right) v_{n-2N+2} + \left(b + \sum_{j=1}^{K} c_j \beta_j \lambda_{jn}\right),$$

which is equivalent to writing:

$$y_n = \tilde{a}_{0,n}(V_n) v_n + \ldots + \tilde{a}_{2N-2,n}(V_n) v_{n-2N+2} + \tilde{b}_n(V_n) \quad \text{(Equation 7)}.$$

The above equation can be viewed as a "linear" convolution between the input variables and the nonlinear coefficients that are time variant nonlinear functions of the input signal. The relative location of input $V_n$ in the multi-dimensional input space determines the values of the $\lambda_{jn}$ elements and therefore the values of the $\tilde{a}_{j,n}$ and $\tilde{b}_n$ coefficients. The dependence of the filter coefficient values on the input signal vector gives the filter its nonlinear property. The function is sometimes referred to as a first order nonlinear filter because the coefficient of each variable is a function that does not depend on the variable itself. In this case, the coefficient is a function of the sign of a function of the variable $v_{n-j}$.

Equation 7 can be rewritten in vector form as:

$$y_n = A^T V_n + b + [c_1 \lambda_{1n} \quad c_2 \lambda_{2n} \quad \ldots \quad c_K \lambda_{Kn}] \quad \text{(Equation 8)}$$

$$\left\{ \begin{bmatrix} \alpha_{0,1} & \alpha_{1,1} & \ldots & \alpha_{2N-2,1} \\ \alpha_{0,2} & \alpha_{1,2} & & \alpha_{2N-2,2} \\ & & \vdots & \\ \alpha_{0,K} & \alpha_{1,K} & \ldots & \alpha_{2N-2,K} \end{bmatrix} \begin{bmatrix} v_n \\ v_{n-1} \\ \vdots \\ v_{n-2N+2} \end{bmatrix} + \begin{bmatrix} \beta_1 \\ \beta_2 \\ \vdots \\ \beta_K \end{bmatrix} \right\}.$$

The equation shows the dependence of the coefficients on $\lambda_{jn}$.

Once written in vector form, the filter can be further manipulated to achieve computational reductions. For example, the vector form can be rewritten as:

$$y_n = A^T V_n + b + [c_1 \lambda_{1n} \quad c_2 \lambda_{2n} \quad \ldots \quad c_K \lambda_{Kn}] \quad \text{(Equation 9)}$$

$$\left\{ \begin{bmatrix} \alpha_{0,1} & 0 & \ldots & 0 \\ \alpha_{0,2} & 0 & \vdots & 0 \\ 0 & \alpha_{1,2} & 0 & 0 \\ 0 & \alpha_{1,3} & 0 & 0 \\ & & \vdots & \\ 0 & 0 & 0 & \alpha_{2N-2,K-1} \\ 0 & 0 & 0 & \alpha_{2N-2,K} \end{bmatrix} \begin{bmatrix} v_n \\ v_{n-1} \\ \vdots \\ v_{n-2N+2} \end{bmatrix} + \begin{bmatrix} \beta_1 \\ \beta_2 \\ \vdots \\ \beta_K \end{bmatrix} \right\},$$

which can be further reduced to:

$$y_n = A^T V_n + b + [c_1 \lambda_{1n} \quad c_2 \lambda_{2n} \quad \ldots \quad c_K \lambda_{Kn}] \quad \text{(Equation 10)}$$

$$\left\{ \begin{bmatrix} 1 & 0 & \ldots & 0 \\ 1 & 0 & \vdots & 0 \\ 0 & 1 & 0 & 0 \\ 0 & 1 & 0 & 0 \\ & & \vdots & \\ 0 & 0 & 0 & 1 \\ 0 & 0 & 0 & 1 \end{bmatrix} \begin{bmatrix} v_n \\ v_{n-1} \\ \vdots \\ v_{n-2N+2} \end{bmatrix} + \begin{bmatrix} \beta_1 \\ \beta_2 \\ \vdots \\ \beta_K \end{bmatrix} \right\},$$

which reduces the original equation to:

$$y_n = A^T V_n + b + \sum_{j=1}^{K_1} c_j |v_n + \beta_j| + \sum_{j=K_1+1}^{K_2} c_j |v_{n-1} + \beta_j| \ldots + \quad \text{(Equation 11)}$$

$$\sum_{j=K_{2N-3}+1}^{K_{2N-2}} c_j |v_{n-2N+2} + \beta_j| = A^T V_n + b +$$

$$\sum_{j=1}^{K_1} c_j \lambda_{j,n}(v_n + \beta_j) + \sum_{j=K_1+1}^{K_2} c_j \lambda_{j,n}(v_{n-1} + \beta_j) \ldots +$$

$$\sum_{j=K_{2N-3}+1}^{K_{2N-2}} c_j \lambda_{j,n}(v_{n-2N+2} + \beta_j),$$

which means $$y_n = \left(a_0 + \sum_{j=1}^{K_1} c_j \lambda_{jn}\right) v_n + \ldots + \quad \text{(Equation 12)}$$

$$\left(a_{2n-2} + \sum_{j=K_{2N-3}+1}^{K_{2N-2}} c_j \lambda_{jn}\right) v_{n-2N+2} + \left(b + \sum_{j=1}^{K} c_j \beta_j \lambda_{jn}\right).$$

As will be shown in more details below, equation 12 has reduced computational burden because the calculation of $\lambda_j$ does not require any multiplication. The computational savings of this function is significant compared to the generalized filter function, where a linear convolution $\vec{\alpha}_j V_n$ is performed before $\lambda_j$ is computed. Since the dependency on the input is of first order, the reduced nonlinear filter function is referred to as a first order low complexity filter function.

Other simplifications using vector manipulation are also possible. For example, $$y_n = A^T V_n + b + [c_1 \lambda_{1n} \quad c_2 \lambda_{2n} \quad \ldots \quad c_K \lambda_{Kn}] \quad \text{(Equation 13)}$$

$$\left\{ \begin{bmatrix} 1 & 0 & \ldots & 0 \\ 1 & 0 & \vdots & 0 \\ 1 & 1 & 0 & 0 \\ 1 & 1 & 0 & 0 \\ & & \vdots & \\ 0 & 0 & 0 & 1 \\ 0 & 0 & 0 & 1 \end{bmatrix} \begin{bmatrix} v_n \\ v_{n-1} \\ \vdots \\ v_{n-2N+2} \end{bmatrix} + \begin{bmatrix} \beta_1 \\ \beta_2 \\ \vdots \\ \beta_K \end{bmatrix} \right\}$$

produces a nonlinear filter $$y_n = \tilde{a}_{0,n}(v_n, v_{n-1}) v_n + \tilde{a}_{1,n}(v_n, v_{n-1}) v_{n-1} + \ldots + \tilde{a}_{2N-2,n}(v_{n-2N+2}) v_{n-2N+2} + \tilde{b}_n(V_n) \quad \text{(Equation 14)}$$

where each coefficient of the first two variables corresponds to a function of the first two variables, and each of the remaining coefficients are functions of the variable that they multiply.

Figure 13:
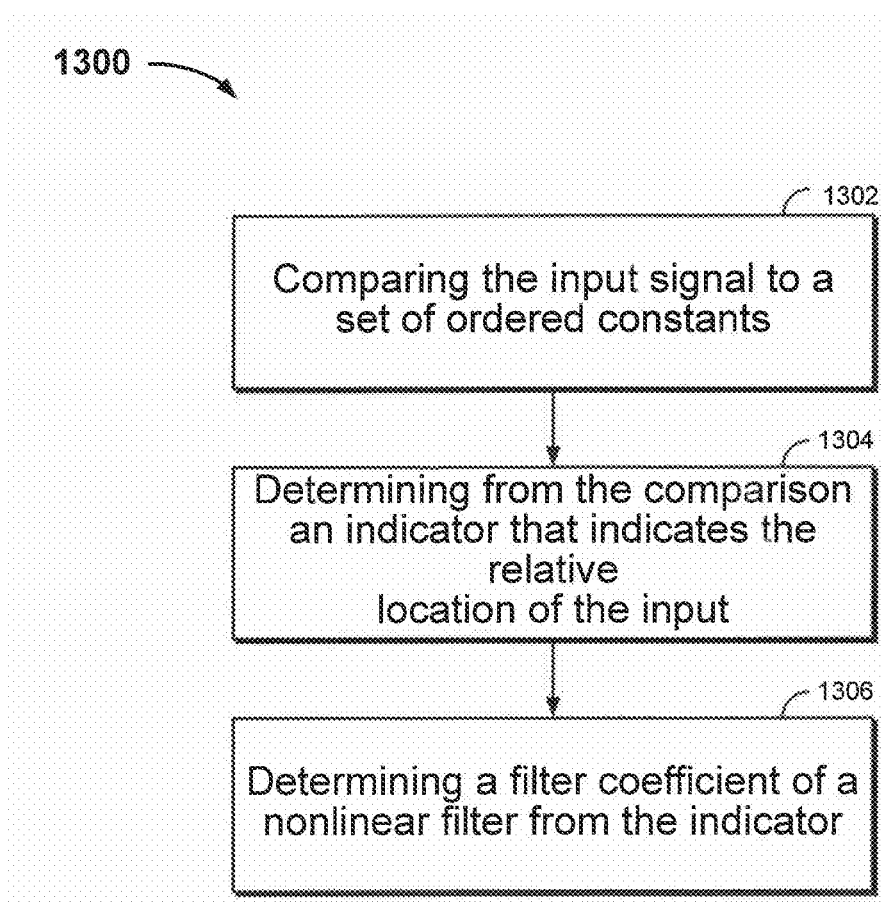
FIG. 13 is a flowchart illustrating an embodiment of the processing of an input signal.

FIG. 13 is a flowchart illustrating an embodiment of the processing of an input signal. In the example shown, process 1300 is applicable to various nonlinear filter embodiments, some of which are shown in greater detail below. An input variable of the input signal is compared to a set of ordered constants (1302). In some embodiments, the set of ordered constants are the $\beta$ constants that divide the input range into multiple sections. The relative location of the input variable within the range of possible inputs is determined (1304). In some embodiments, the relative location is determined using the value of $\lambda_j$. Using the relative location, one or more filter coefficients of a nonlinear filter are determined (1306). The coefficients, which depend on the inputs, may vary over time. The coefficients can be determined without requiring multiplication operations, allowing the filter to process its inputs efficiently. In some embodiments, the nonlinear filter is used to process the input and generate the output. In some embodiments, the nonlinear filter with the derived coefficients is used as a coefficient for a higher order nonlinear filter, which is then used to filter the input and generate the output.

Figure 14:
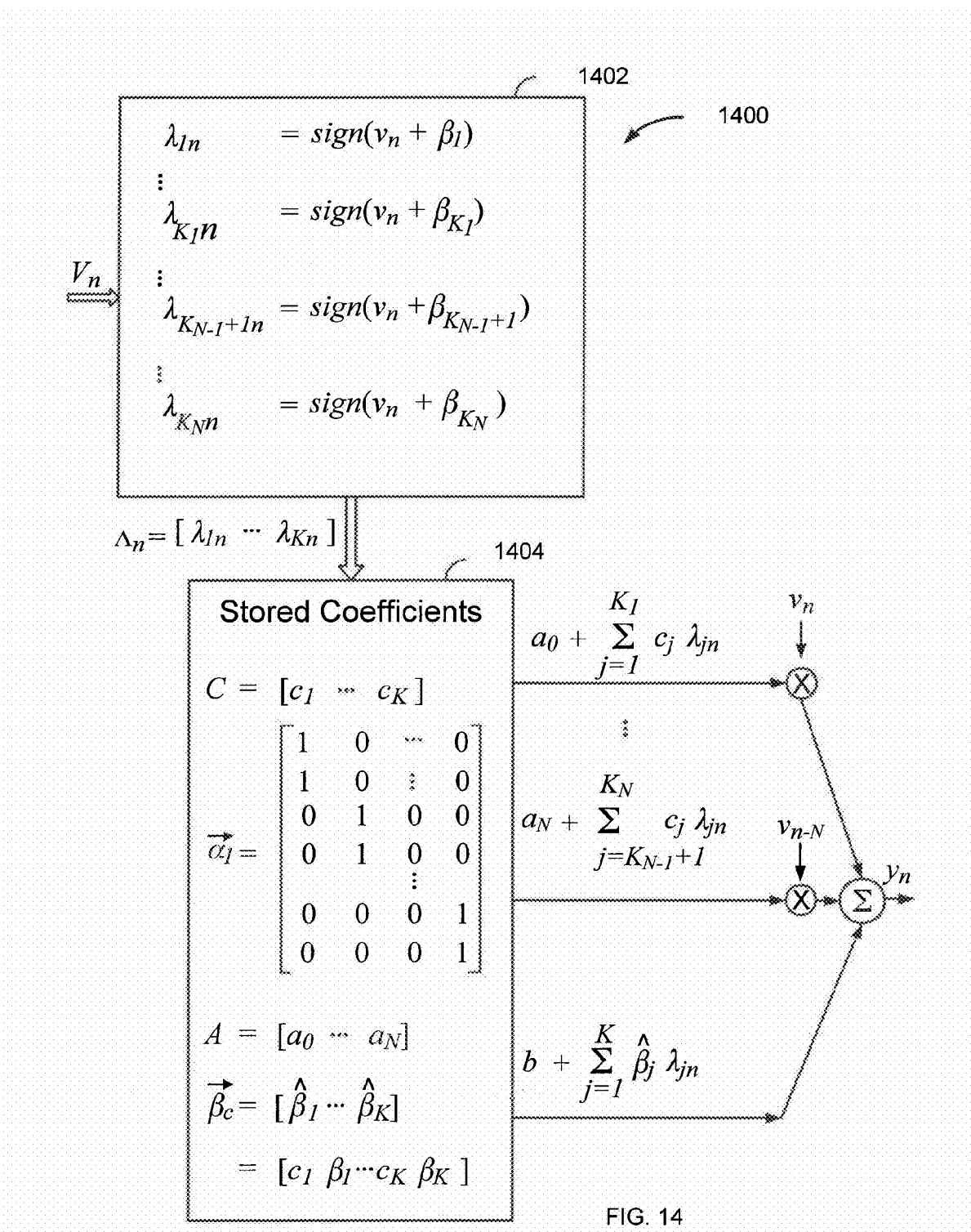
FIG. 14 is a block diagram illustrating a first order low complexity nonlinear filter embodiment.

FIG. 14 is a block diagram illustrating a first order low complexity nonlinear filter embodiment. Filter 1400 shown in this example has a transfer function that is equivalent to equation 12. The input vector $V_n$ is sent to a sign processor 1402 to generate $\lambda_{jn}$. The constant coefficients, including $c_1$, $a_j$, $c_j\beta_j$ are stored in a memory 1404, which is implemented using registers or other appropriate data storage components. The first order coefficients of equation 12 are computed by multiplying $\lambda$ with the corresponding $c_j$ or $\beta_j$, summing the results, and adding to the corresponding constant $a_j$. The coefficients are then multiplied with an input variable v if appropriate. The results of the individual first order filters are combined to generate a nonlinear output $y_n$.

Figure 15:
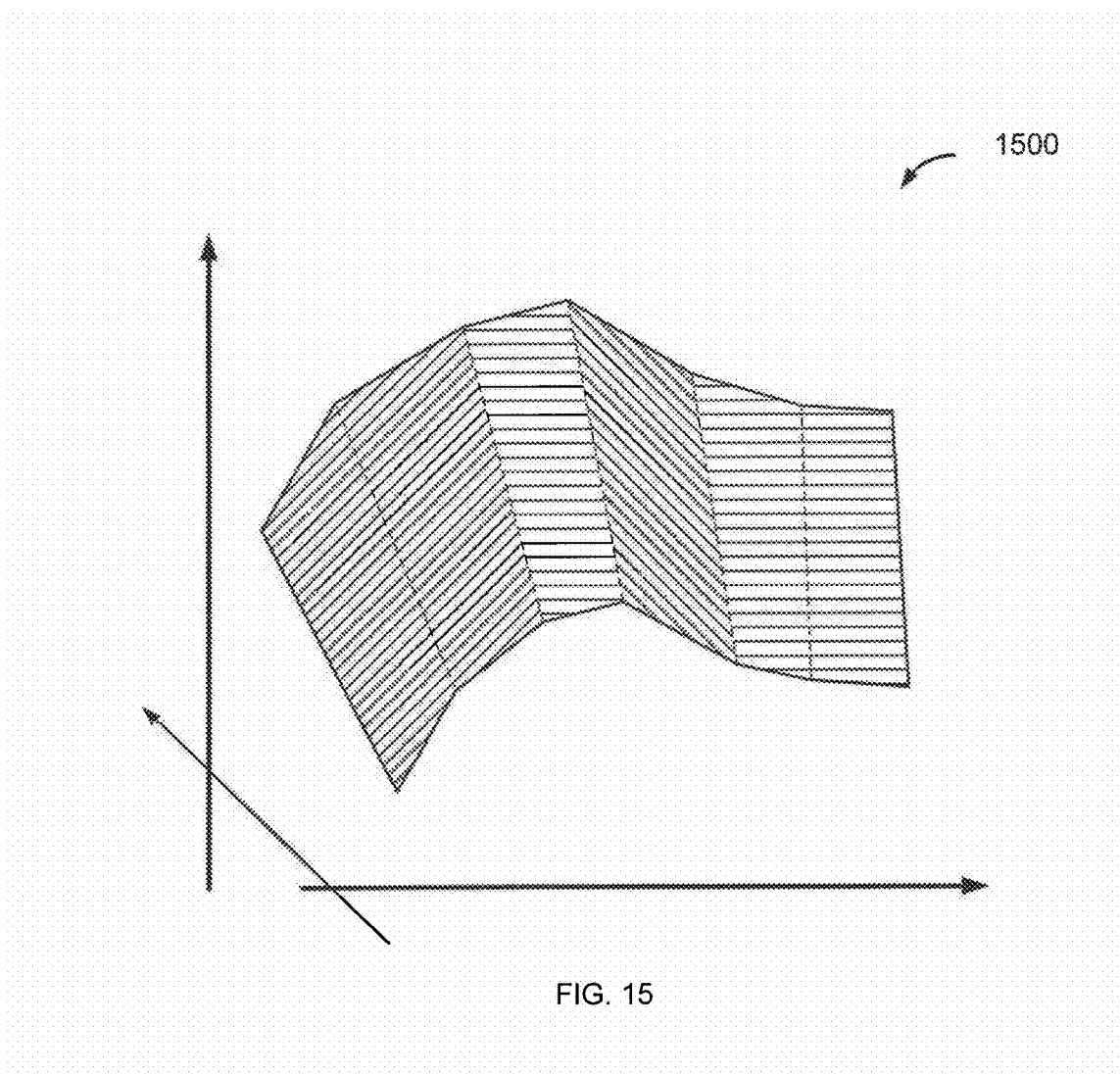
FIG. 15 is a diagram illustrating a 3-D manifold of the output of a first order nonlinear filter embodiment.

FIG. 15 is a diagram illustrating a 3-D manifold of the output of a first order nonlinear filter embodiment. In this example, filter function 1500 is a function of two input variables. The first order terms form planar segments of the manifold. Function 1500 can be used to approximate a continuous, 3-D nonlinear function. Functions involving higher dimensions can be approximated similarly.

As shown previously, the generalized nonlinear filter function of equation 2 can be transformed to a first order nonlinear filter as shown in equation 7. A further extension of the nonlinear filter transformation leads to another nonlinear filter expression:

$$y_n = f_{0,n}(V_n) + \ldots + f_{2N-2,n}(V_n)v_{n-2N+2} + \tilde{a}_{0,n}(V_n)v_n + \ldots + \tilde{a}_{2N-2,n}(V_n)v_{n-2N+2}\tilde{b}_n(V_n) \quad \text{(Equation 15)}$$

where each $f_{k,n}(V_n)$ is a first order nonlinear function $$f_{k,n}(V_n) = A_k^T V_n + b_k + \sum_{j=1}^{K} c_j^k |\tilde{\alpha}_j^k V_n + \beta_j^k| = \quad \text{(Equation 16)}$$

$$\tilde{a}_{0,n}^k(V_n)v_n + \ldots + \tilde{a}_{2N-2,n}^k(V_n)v_{n-2N+2} + \tilde{b}_n^k(V_n).$$

Thus, the terms of equation 15 that have $f_{k,n}(V_n)$ as coefficients are second order functions of the input variables (as used herein, a second order function includes at least one term of an input variable to the power of 2 or a cross product of input variables). In different embodiments, the coefficients may be multiplied by the input variable, a delayed input variable, a derivative of the input, or other appropriate characteristics of the input.

Figure 16:
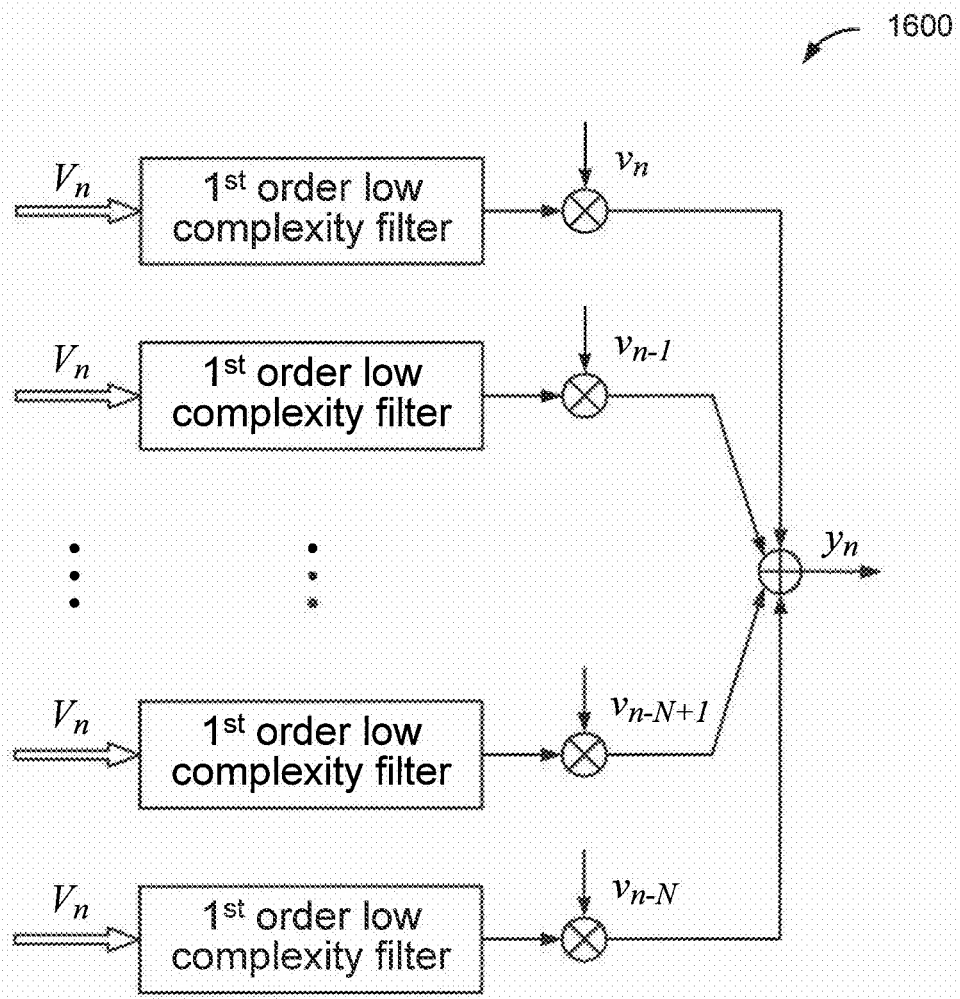
FIG. 16 is a block diagram illustrating an embodiment of a second order low complexity nonlinear filter.

FIG. 16 is a block diagram illustrating an embodiment of a second order low complexity nonlinear filter. In the example shown, second order low complexity filter 1600 is implemented using a plurality of first order low complexity filters. The coefficients of the first order low complexity filters are computed using techniques such as least mean squared error. The input vector is sent to each of the first order low complexity filters, and each of the filter outputs is multiplied with a corresponding input variable. The results are combined to generate the output $y_n$.

Figure 17:
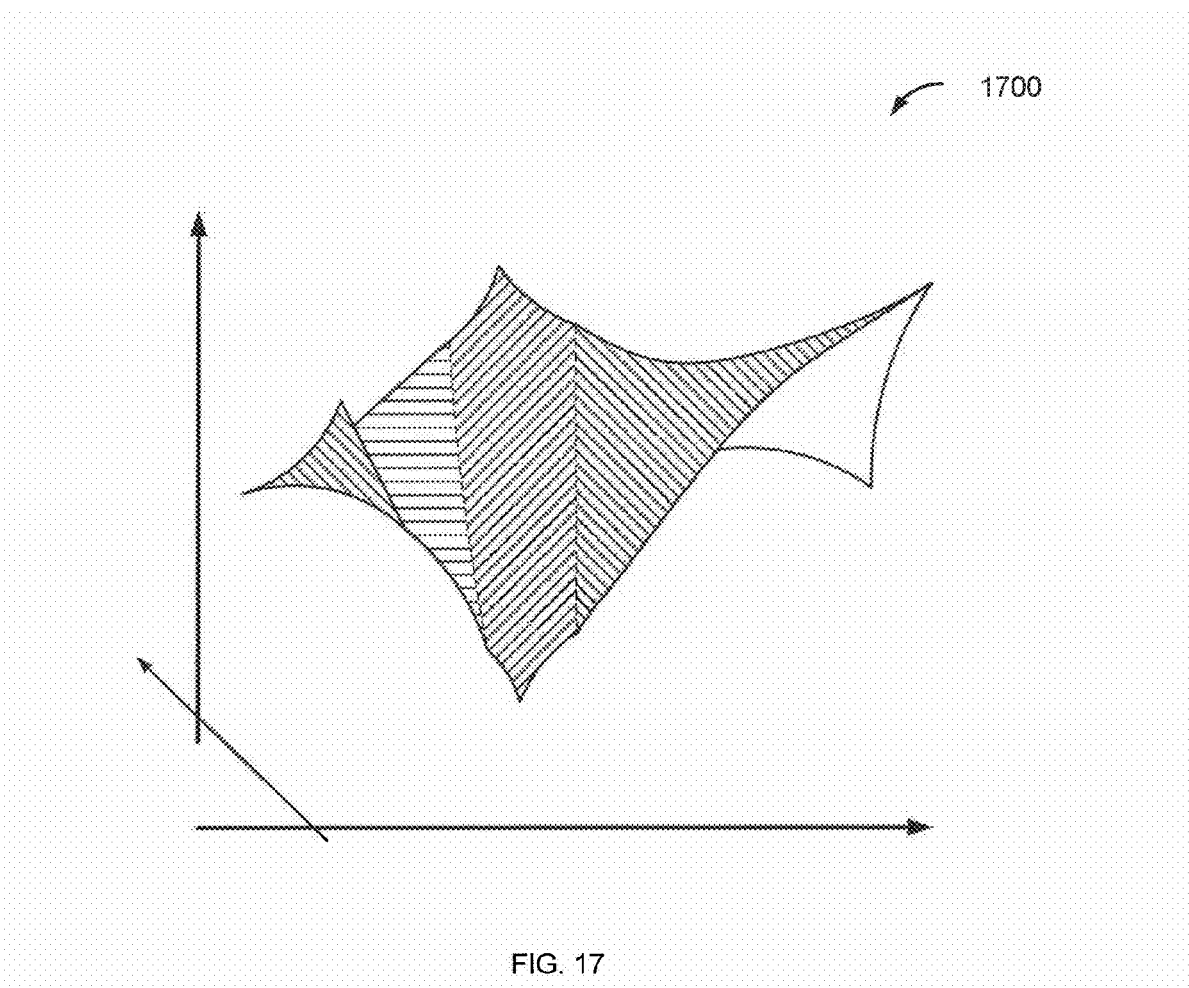
FIG. 17 is a diagram illustrating a 3-D manifold of the output of a second order nonlinear filter embodiment.

FIG. 17 is a diagram illustrating a 3-D manifold of the output of a second order nonlinear filter embodiment. In this example, filter function 1700 is a function of two input variables. The second order terms form parabolic segments of the manifold. Higher order filters such as this can sometimes be used to better approximate the multi-dimensional manifold that defines the desired nonlinear function, such as the actual transfer function of a system, an error function, etc.

The approach can be further extended to develop third or higher order nonlinear filters.

Figure 18:
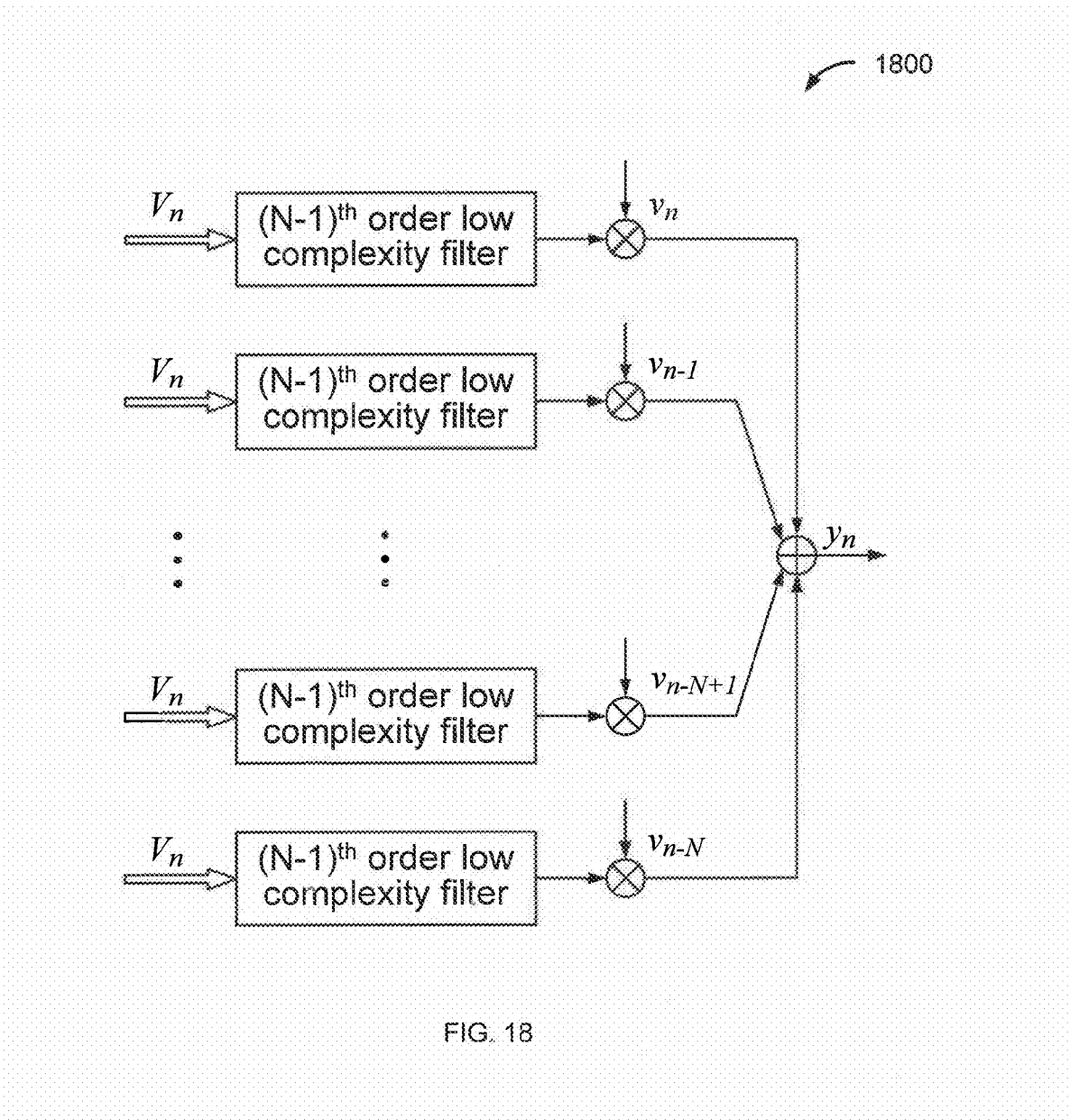
FIG. 18 is a block diagram illustrating an embodiment of an N-th order nonlinear filter.

FIG. 18 is a block diagram illustrating an embodiment of an N-th order nonlinear filter. In the example shown, a filter of order N (N>2) is implemented by nesting lower order filters. N-th order low complexity filter 1800 includes a plurality of (N−1)-th order low complexity filters. The outputs of the (N−1)-th order filters are multiplied with the input variables. Thus, the (N−1)-th order filters act as input coefficients of the N-th order filter. Each of the (N−1)-th order filters in turn may be implemented using a plurality of (N−2)-th order low complexity filters as input coefficients. Nesting allows higher order filters to be more easily implemented.

In some embodiments, the nonlinear filter is implemented as a zero order nonlinear filter, where the transfer function of the filter in each discrete region is a constant. The zero order filter is sometimes referred to as a "catastrophic" structure because of the discontinuities in the filter response. A general form of a zero order nonlinear filter is expressed as:

$$y_n = a_0 + a_1 + \ldots + a_{2N-2} + b + \quad \text{(Equation 17)}$$
$$\sum_{j=1}^{K} c_j^0 \lambda_j^0 + \sum_{j=1}^{K} c_j^1 \lambda_j^1 + \ldots + \sum_{j=1}^{K} c_j^{2N-2} \lambda_j^{2N-2}.$$

In some embodiments, the zero order nonlinear filter based on equation 17 is implemented similarly as filter 1400 of FIG. 14, except that the multiplications by $v_n$, $v_{n-1}$, etc. are omitted and the outputs $$a_0 + \sum_{j=1}^{K} c_j^0 \lambda_{jn}^0,$$

$$a_N + \sum_{j=1}^{K} c_j^1 \lambda_{jn}^1,$$

etc. are summed directly.

Nonlinear filters of different orders can be combined to form a new filter with the desired transfer function.

Figure 19:
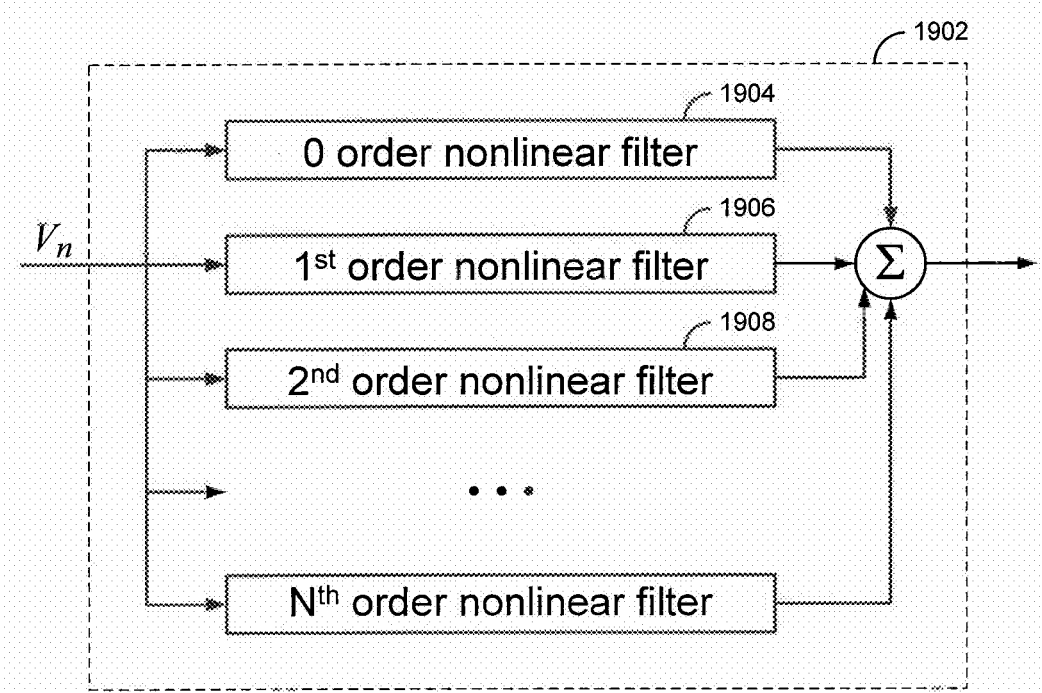
FIG. 19 are block diagrams illustrating a nonlinear filter embodiment.

FIG. 19 are block diagrams illustrating a nonlinear filter embodiment. In the example shown, nonlinear filter 1902 is implemented using a zero order nonlinear filter 1904, a first order nonlinear filter 1906, a second order nonlinear filter 1908, and other higher order nonlinear filters up to order N. More than one filter of a certain order may be used. One or more orders may be omitted. The selection of N depends on the requirements of filter 1902 and may vary for different embodiments. A single zero order nonlinear filter may be sufficient for some applications while an N greater than 3 may be required for some others. A nonlinear filter constructed by combining different orders of nonlinear filters can achieve the desired filter requirements with improved computational efficiency.

The complexity of nonlinear filters can be further reduced in some embodiments. Take the following first order filter for example:

$$y_n = \text{(Equation 18)}$$
$$a_0 v_n + a_1 v_{n-1} + b + \sum_{j=1}^{K} c_j^0 |v_n + \beta_j^0| + \sum_{j=1}^{K} c_j^1 |v_{n-1} + \beta_j^1| =$$
$$\left(a_0 + \sum_{j=1}^{K} c_j^0 \lambda_j^0\right) v_n + \left(a_1 + \sum_{j=1}^{K} c_j^1 \lambda_j^1\right) v_{n-1} +$$
$$\left(b + \sum_{j=1}^{K} c_j^0 \lambda_j^0 \beta_j^0 + \sum_{j=1}^{K} c_j^1 \lambda_j^1 \beta_j^1\right) =$$
$$\tilde{a}_{0,n} v_n + \tilde{a}_{1,n} v_{n-1} + \tilde{b}_n$$

where $$\lambda_j^m = \text{sign}(v_n + \beta_j^m). \quad \text{(Equation 19)}$$

Since $\lambda_j^1 = \pm 1$, the coefficient $$\sum_{j=1}^{K} c_j^m \lambda_j^m$$

can be computed without any multiplication. Similarly, $$\sum_{j=1}^{K} c_j^m \lambda_j^m \beta_j^m$$

can also be computed without multiplications since the product $c_j^m \beta_j^m$ can be pre-computed, stored and looked up when needed. Thus, the nonlinear filter of equation 18 can be implemented as a first order filter that requires only two multiplication operations.

Figure 20:
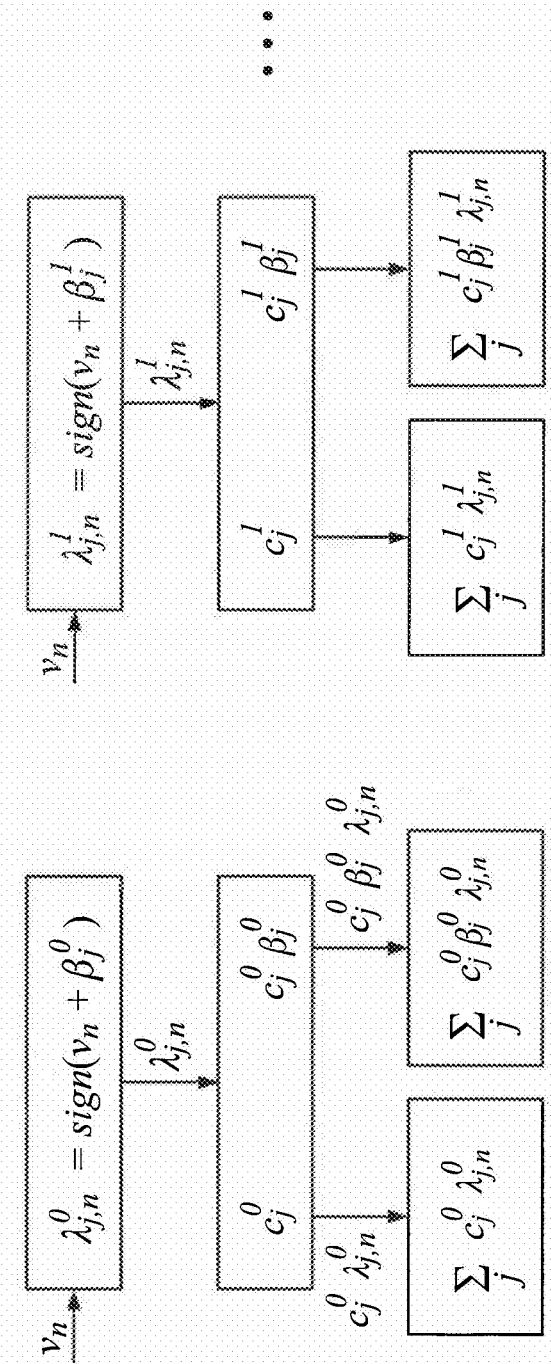
FIG. 20 is a diagram illustrating a computational block embodiment used to compute the nonlinear filter coefficients.

FIG. 20 is a diagram illustrating a computational block embodiment used to compute the nonlinear filter coefficients. In this example, the coefficients for the filter shown in equation 21 are computed. Different ranges of inputs result in different $\lambda_j^m$, which can be either 1 or −1. Potential coefficient values $$\sum_{j=1}^{K} c_j^m \lambda_j^m \text{ and } \sum_{j=1}^{K} c_j^m \lambda_j^m \beta_j^m$$

that correspond to different input ranges are pre-computed and stored in registers. When an input is received, it is compared with the set of $\beta_j^m$ to determine its relative location in the range of inputs and the corresponding pre-computed coefficient value for this particular location.

In some embodiments, the non-linear filter is implemented using a low-complexity non-linear filter form that has a low number of multiply operations while maintaining a powerful ability to emulate very complex nonlinear distortion functions. Low complexity means low cost, low power dissipation, and low noise. The coefficients of a low-complexity non-linear filter are set by iteratively reducing the error between a desired set of samples (e.g., reference signal) as filtered using the distortion function or model and the actual samples (e.g., the feedback signal which includes linear and non-linear distortion introduced by components and processing). In some embodiments, the reduction of error is achieved by fitting the coefficients of the non-linear model (e.g., using a gradient descent method) to minimize the error.

CONCLUSION

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments, but should be defined only in accordance with the following claims and their equivalents.

What is claimed is:

1. A system for signal processing, comprising:
    mode selection logic configured to configure an association between a plurality of signal processing units and one or more channels of a plurality of channels based upon a selected mode of a plurality of modes, wherein the plurality of modes includes a single-channel mode and a multi-channel mode;
    a correlator, the correlator comprising:
        a receiving unit configured to:
            receive a feedback signal comprising a sample corresponding to a first channel in the plurality of channels, and
            receive a reference signal corresponding to the first channel,
        an error calculating unit configured to calculate an error based on the feedback signal and the reference signal, and
        a correction calculation unit configured to generate correcting information based on the error; and
    a selector coupled to an output of the correlator, wherein the selector is configured to provide the correcting information to a correcting unit of a signal processing unit that is used to process information for the first channel.

2. The system of claim 1, wherein the correlator is configured to receive the feedback signal from an analog-to-digital converter that is coupled to a second selector, and wherein the second selector is configured to sample the feedback signal from an output signal of a plurality of output signals that are sent to an antenna.

3. The system of claim 2, wherein the second selector is configured to sample the feedback signal at a fractional rate of a rate of processing of the first channel.

4. The system of claim 3, wherein the second selector is configured to select the feedback signal according to a time division rotation of the plurality of output signals.

5. The system of claim 4, wherein the time division rotation is substantially synchronized with a delay corresponding to providing the correcting information.

6. The system of claim 1, wherein the mode selection logic, the correlator, and the selector are configured and arranged to form an integrated device.

7. A method for signal processing, comprising:
configuring an association between a plurality of signal processing units and one or more channels of a plurality of channels based on a selected mode of a plurality of modes, wherein the plurality of modes includes a single-channel mode and a multi-channel mode;
receiving a feedback signal corresponding to a first channel in the plurality of channels;
receiving a reference signal corresponding to the first channel;
calculating an error based on the feedback signal and the reference signal;
generating a correcting information based on the error; and
providing the correcting information to a correcting unit of a signal processing unit that is used to process information for the first channel.

8. The method of claim 7, wherein the feedback signal is sampled from an output signal of a plurality of output signals that are sent to an antenna.

9. The method of claim 8, wherein the feedback signal is sampled at a fractional rate of a rate of processing of the first channel.

10. The method of claim 9, wherein the feedback signal is selected according to a time division rotation of the plurality of output signals sent to the antenna.

11. The method of claim 10, wherein the time division rotation is substantially synchronized with a delay corresponding to providing the correcting information.

12. A base station processing unit, comprising:
a plurality of signal processing units (SPUs) comprising a plurality of correcting units;
a correlator configured to:
receive a feedback signal comprising a sample of an output signal corresponding to a first channel in the plurality of channels,
receive a reference signal corresponding to the first channel, and
generate, based on the feedback signal and the reference signal, correcting information for the first channel; and
a selector coupled to the correlator, wherein the selector is configured to provide the correcting information to a first correcting unit, in the plurality of correcting units, of a first signal processor, in the plurality of signal processors, and wherein the first correcting unit is used to process information for the first channel.

13. The base station processing unit of claim 12, wherein the selector is further configured to provide the correcting information to a second correcting unit in the plurality of correcting units, wherein the second correcting unit is used to process the information for the first channel.

14. The base station processing unit of claim 12, further comprising:
mode selection logic configured to select a mode for the base station processing unit, and wherein the mode determines a number of signals that that base station processing unit can process.

15. The base station processing unit of claim 12, further comprising:
SPU selection logic configured to select a first set of SPUs in the plurality of SPUs, wherein the first set of SPUs corresponds to the first channel.

16. The base station processing unit of claim 12, farther comprising:
a selection switch configured to route a plurality of input signals from a telecommunications operator system to corresponding SPUs in the plurality of SPUs.

17. The base station processing unit of claim 16, farther comprising:
a second selector coupled to the selection switch, wherein the second selector is configured to:
receive the plurality of input signals,
select the reference signal from the plurality of input signals, and
send the reference signal to the correlator.

18. The base station processing unit of claim 12, further comprising:
a memory configured to store state information of the correlator.

19. The base station processing unit of claim 18, wherein the state information comprises context information stored during a previous generation of previous correcting information for the first channel, and wherein the context information is used to generate the correcting information.

20. The base station processing unit of claim 12, wherein the correcting information is used to reduce distortion in the first channel.

21. The base station processing unit of claim 12,
wherein the first signal processor further comprises:
control logic, and
a crest factor filter, and
wherein the first correcting unit further comprises:
a digital signal processor; and
a linear filter.

* * * * *

UNITED STATES PATENT AND TRADEMARK OFFICE
CERTIFICATE OF CORRECTION

PATENT NO. : 8,739,000 B2  
APPLICATION NO. : 13/421328  
DATED : May 27, 2014  
INVENTOR(S) : Ryan et al.

Page 1 of 1

It is certified that error appears in the above-identified patent and that said Letters Patent is hereby corrected as shown below:

In the Claims

Column 22, line 19, claim 16, please replace "farther" with --further--.

Column 22, line 24, claim 17, please replace "farther" with --further--.

Signed and Sealed this  
Ninth Day of September, 2014

Michelle K. Lee  
*Deputy Director of the United States Patent and Trademark Office*